United States Patent
Ishikawa et al.

(10) Patent No.: US 8,493,594 B2
(45) Date of Patent: Jul. 23, 2013

(54) IMAGE PROCESSING APPARATUS, METHOD, AND PROGRAM FOR PERFORMING INTERRUPTION PRINTING

(75) Inventors: Yudai Ishikawa, Kawasaki (JP); Yuji Izawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 12/638,411

(22) Filed: Dec. 15, 2009

(65) Prior Publication Data

US 2010/0157363 A1 Jun. 24, 2010

(30) Foreign Application Priority Data

Dec. 22, 2008 (JP) .................................. 2008-325807
Dec. 22, 2008 (JP) .................................. 2008-325822

(51) Int. Cl.
*G06F 3/12* (2006.01)
*G06K 15/00* (2006.01)

(52) U.S. Cl.
USPC ....................................... 358/1.15; 358/1.14

(58) Field of Classification Search
None
See application file for complete search history.

(56) References Cited

U.S. PATENT DOCUMENTS

| 2006/0262342 | A1* | 11/2006 | Kumagai et al. | 358/1.14 |
| 2007/0177185 | A1* | 8/2007 | Ogura et al. | 358/1.14 |
| 2008/0239357 | A1* | 10/2008 | Matsushima | 358/1.13 |
| 2008/0259394 | A1* | 10/2008 | Yamada | 358/1.15 |
| 2008/0304104 | A1* | 12/2008 | Hirama | 358/1.15 |
| 2009/0279118 | A1* | 11/2009 | Ito | 358/1.14 |

FOREIGN PATENT DOCUMENTS

| JP | 11212745 | * 8/1999 |
| JP | 2008-137329 | 6/2008 |

* cited by examiner

*Primary Examiner* — Fan Zhang
(74) *Attorney, Agent, or Firm* — Fitzpatrick, Cella, Harper & Scinto

(57) ABSTRACT

An image processing apparatus stores user identification information of a first user, and sends a print instruction including the stored user identification information to a print managing server. The apparatus receives print data of the first user managed in association with the user identification information of the first user included in the sent print instruction, and prints the received print data of the first user. The apparatus receives user identification information of a second user while printing of the print data of the first user is being performed and discriminates whether interruption printing of print data of the second user can be performed, and performs interruption printing of the print data of the second user if the interruption printing can be performed. The apparatus restarts printing of the print data of the first user after interruption printing of the print data of the second user is completed.

21 Claims, 24 Drawing Sheets

FIG. 4
BIBLIOGRAPHICAL INFORMATION 40

| | |
|---|---|
| LOGIN USER NAME | 401 |
| PRINT DATA STORING SERVER IP ADDRESS | 402 |
| PATH OF PRINT DATA | 403 |
| DOCUMENT NAME | 404 |
| THE NUMBER OF PRINT COPIES | 405 |
| PAGE | 406 |
| PRESENCE OR ABSENCE OF ERROR | 407 |
| TIME STAMP | 408 |
| PERMISSION OR INHIBITION OF INTERRUPTION PRINTING | 409 |
| THE NUMBER OF INTERRUPTION PERMITTED JOBS | 410 |

FIG. 5
TABLE FOR IC CARD AUTHENTICATION 50

| | |
|---|---|
| CARD MANUFACTURING NUMBER | 501 |
| USER NAME | 502 |
| E-MAIL ADDRESS | 503 |
| DIVISION ID | 504 |
| DIVISION PASSWORD | 505 |
| ADMINISTRATOR AUTHORITY | 506 |
| PRINT AUTHORITY | 507 |

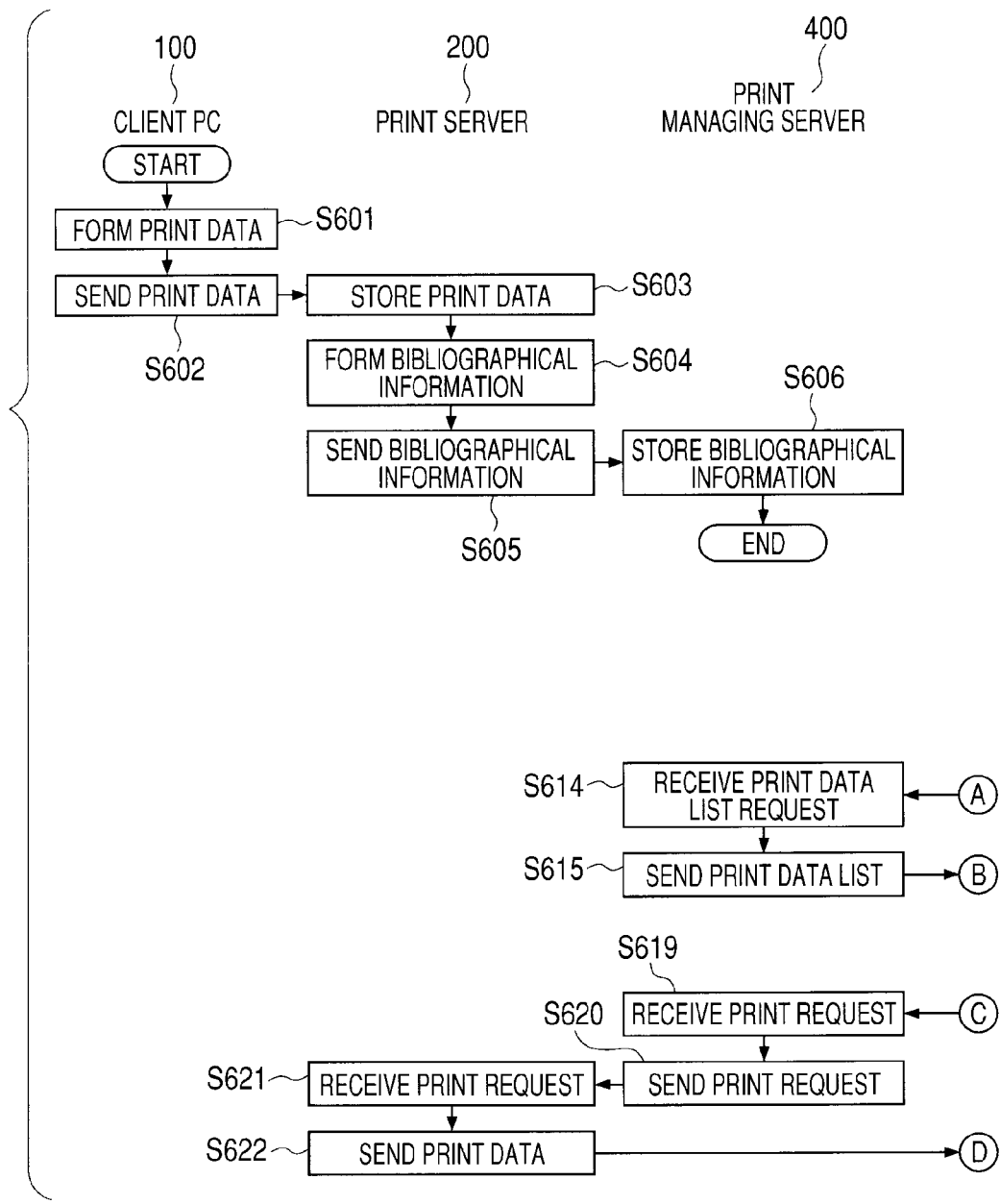

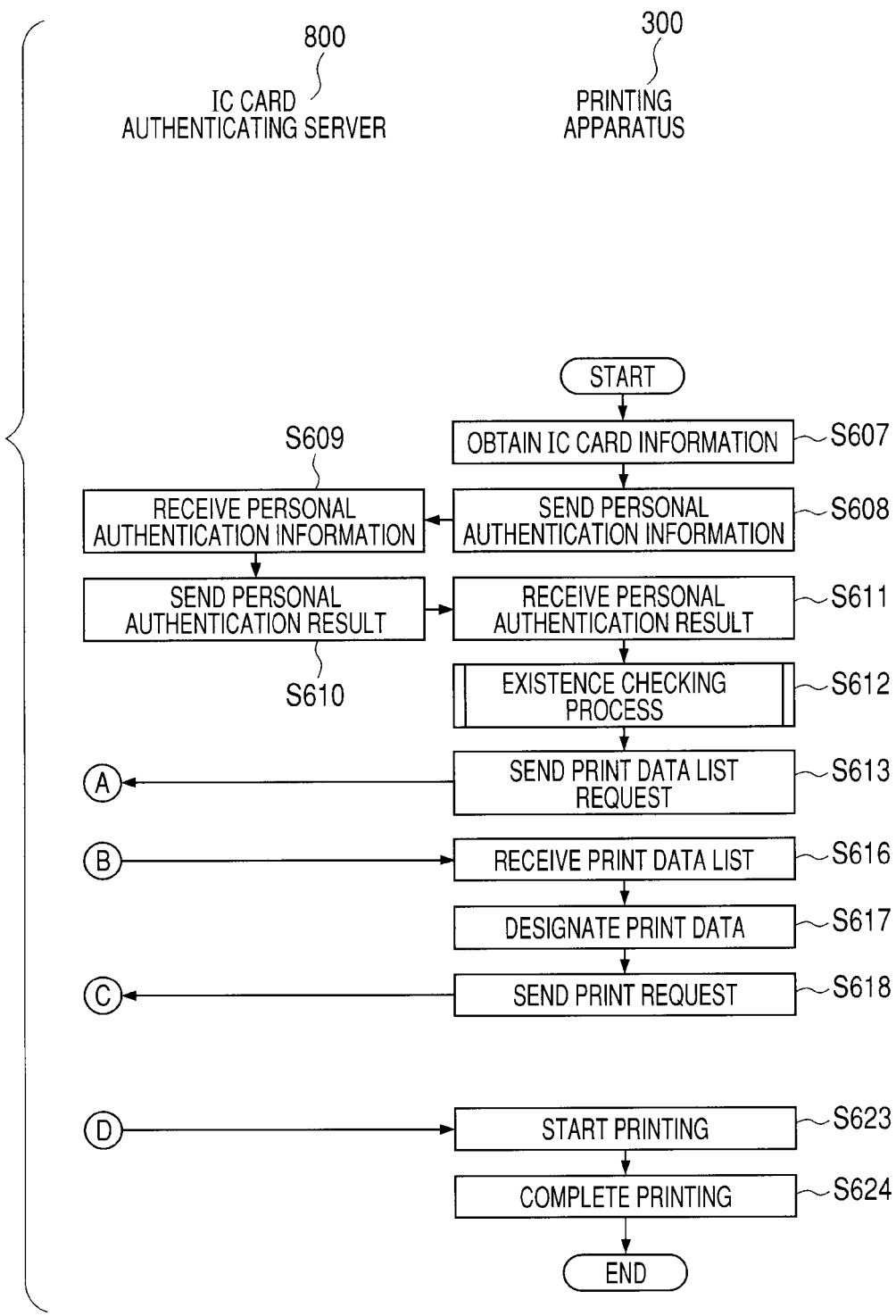

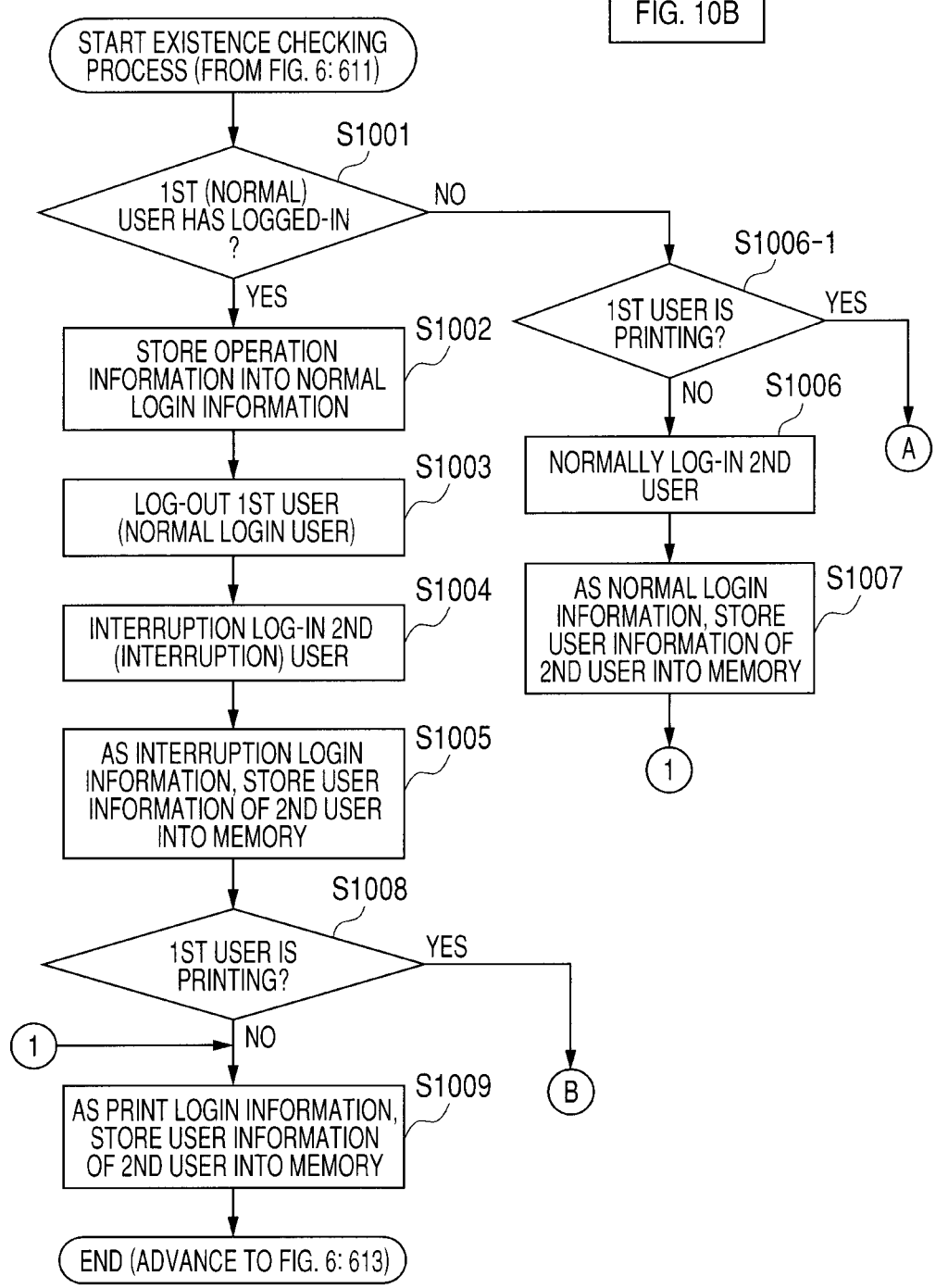

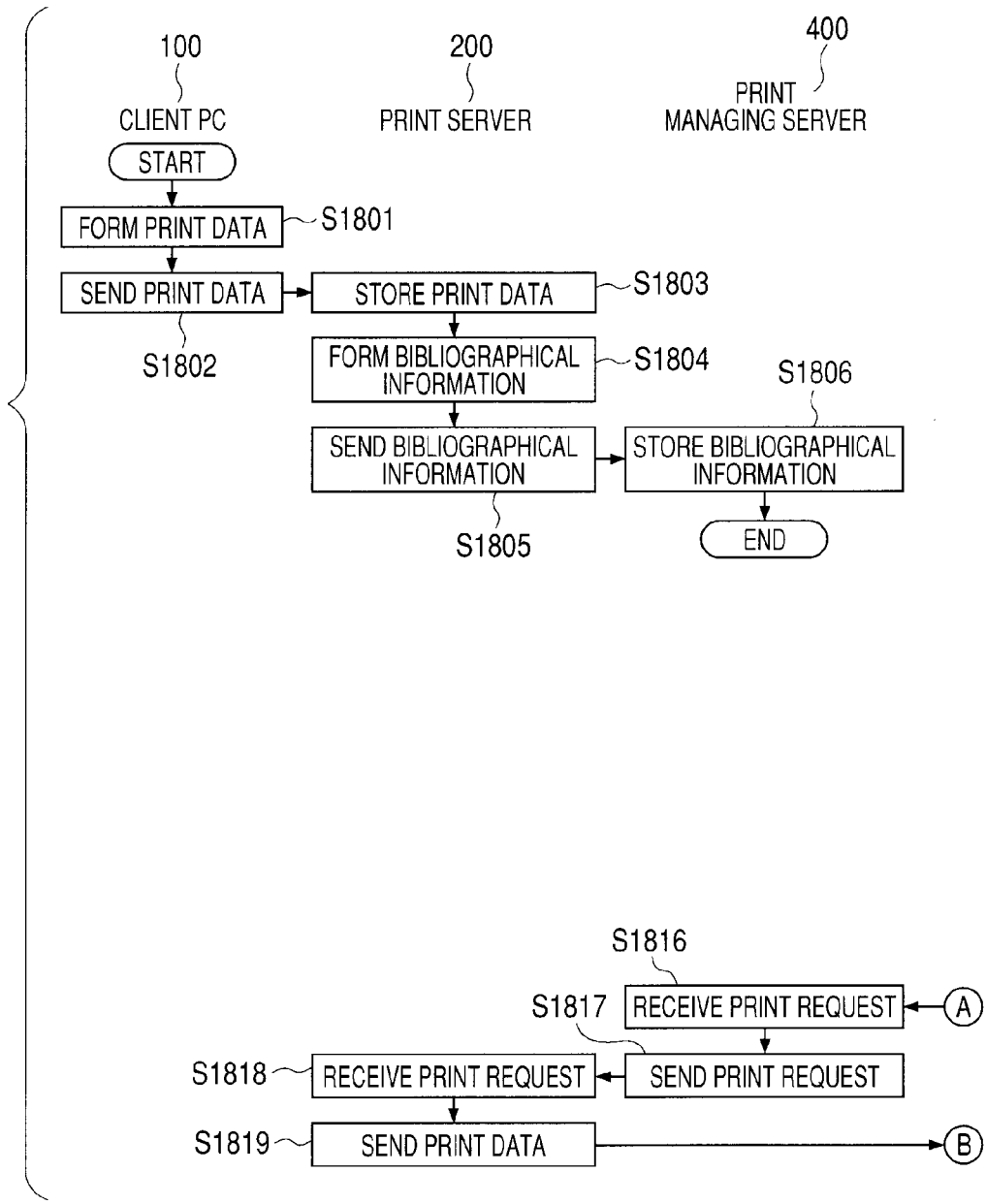

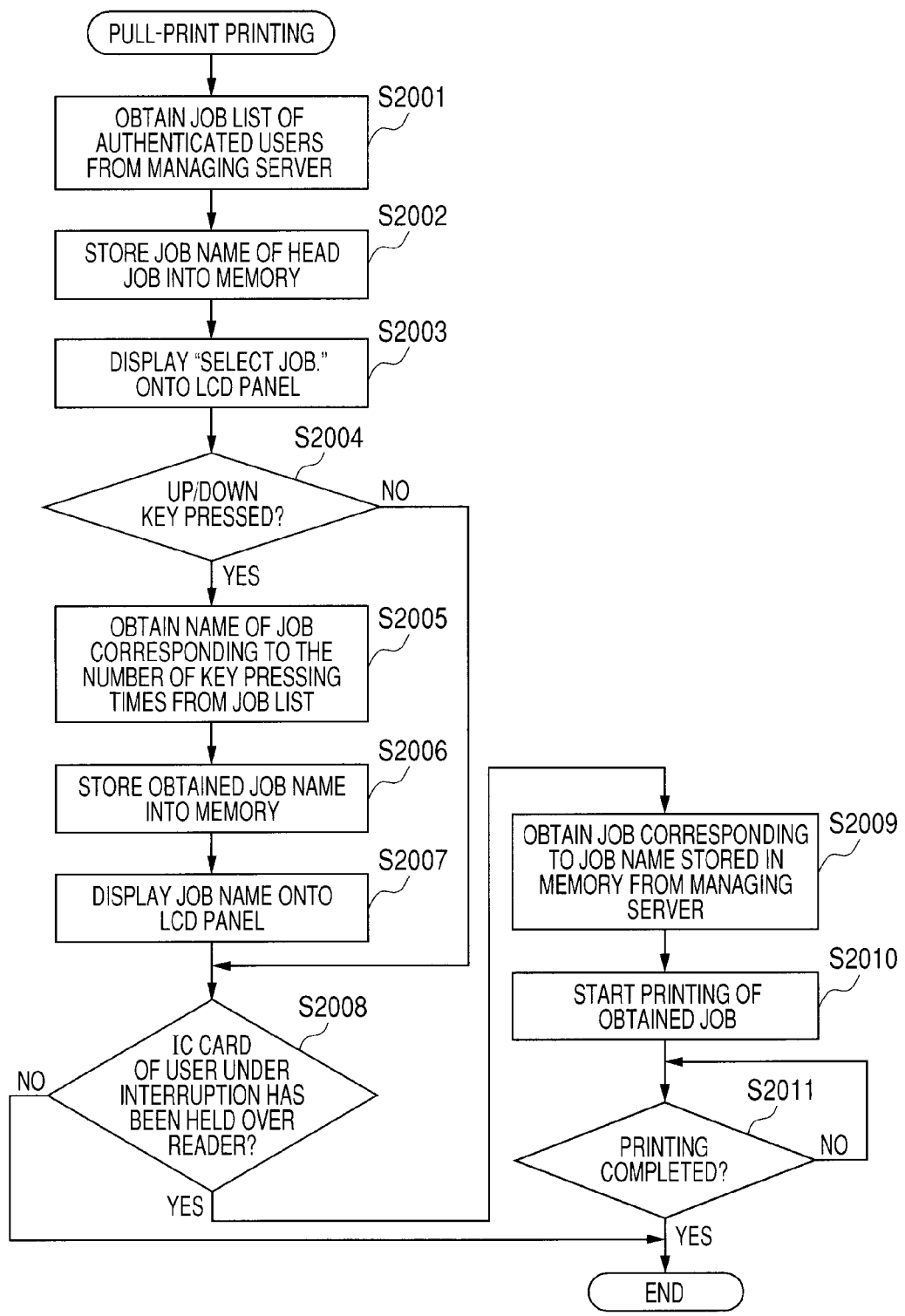

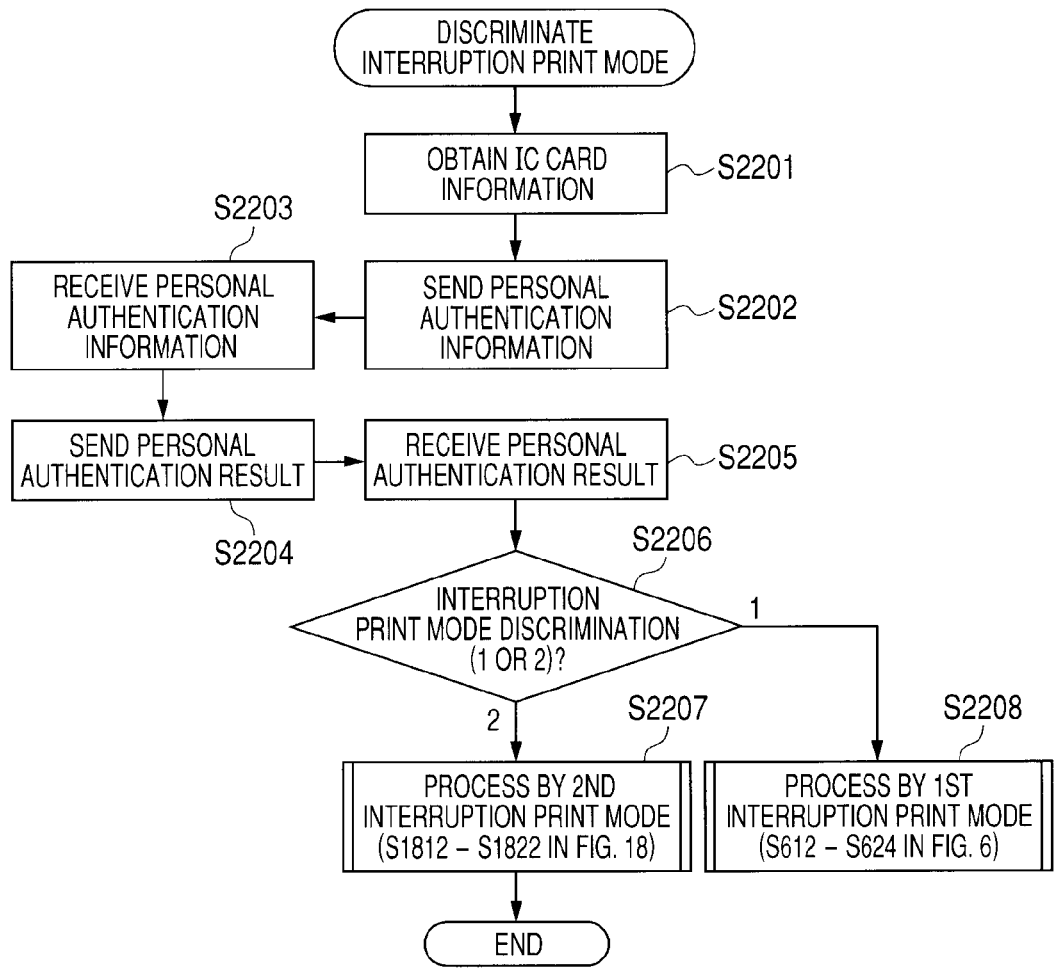

IMAGE PROCESSING APPARATUS, METHOD, AND PROGRAM FOR PERFORMING INTERRUPTION PRINTING

BACKGROUND OF THE INVENTION

1. Field of the Invention

The present invention relates to an image processing apparatus, a control method, an image processing system, and a program. More particularly, the present invention relates to an image processing apparatus that performs a login process upon receiving user identification information.

2. Description of the Related Art

Conventionally, for image processing apparatuses that perform a login process when a storage medium storing identification information is read by a reader, systems have been conceived which perform a printing process based on the identification information and perform an interrupting process based on the difference among identification information to be read by the reader.

For example, Japanese Patent Application Laid-Open No. 2008-137329 discloses a print system capable of readily executing a process reflecting settings allocated to an interrupting user when a process is to be interrupted using card authentication.

SUMMARY OF THE INVENTION

An image processing apparatus according to the present invention includes: an identification information storage unit that stores user identification information of a first user in response to receiving the user identification information of the first user; a sending unit that sends a print instruction including the stored user identification information of the first user to a print managing server; a receiving unit that receives print data of the first user managed in association with the user identification information of the first user included in the sent print instruction; a printing unit that prints the received print data of the first user; an interruption printing permission/inhibition discriminating unit that receives user identification information of a second user while printing of the print data of the first user is being performed and discriminates whether or not interruption printing of print data of the second user managed in association with the user identification information of the second user can be performed; an interruption printing unit that performs interruption printing of the print data of the second user when it is discriminated that interruption printing of the print data of the second user can be performed; and a print restarting unit that restarts printing of the print data of the first user after the interruption printing of the print data of the second user is completed.

Further features of the present invention will become apparent from the following description of exemplary embodiments with reference to the attached drawings.

BRIEF DESCRIPTION OF THE DRAWINGS

FIG. 4 is a data configuration diagram illustrating an example of bibliographical information 40.

FIG. 5 is a data configuration diagram illustrating an example of a table for IC card authentication 50.

FIG. 6 is comprised of FIGS. 6A and 6B showing flowcharts illustrating an overall flow of a first interruption print mode of the print system 1.

FIG. 20 is a second flowchart illustrating an example of a process procedure of the second interruption print mode.

FIG. 21 is a data configuration diagram illustrating an example of a user management table 2100 of the print system 1.

FIG. 22 is a flowchart illustrating an example of execution process procedures of the first interruption print mode and the second interruption print mode of the print system 1.

DESCRIPTION OF THE EMBODIMENTS

Hereinafter, embodiments of the present invention will be described in detail with reference to the drawings.

Figure 1:
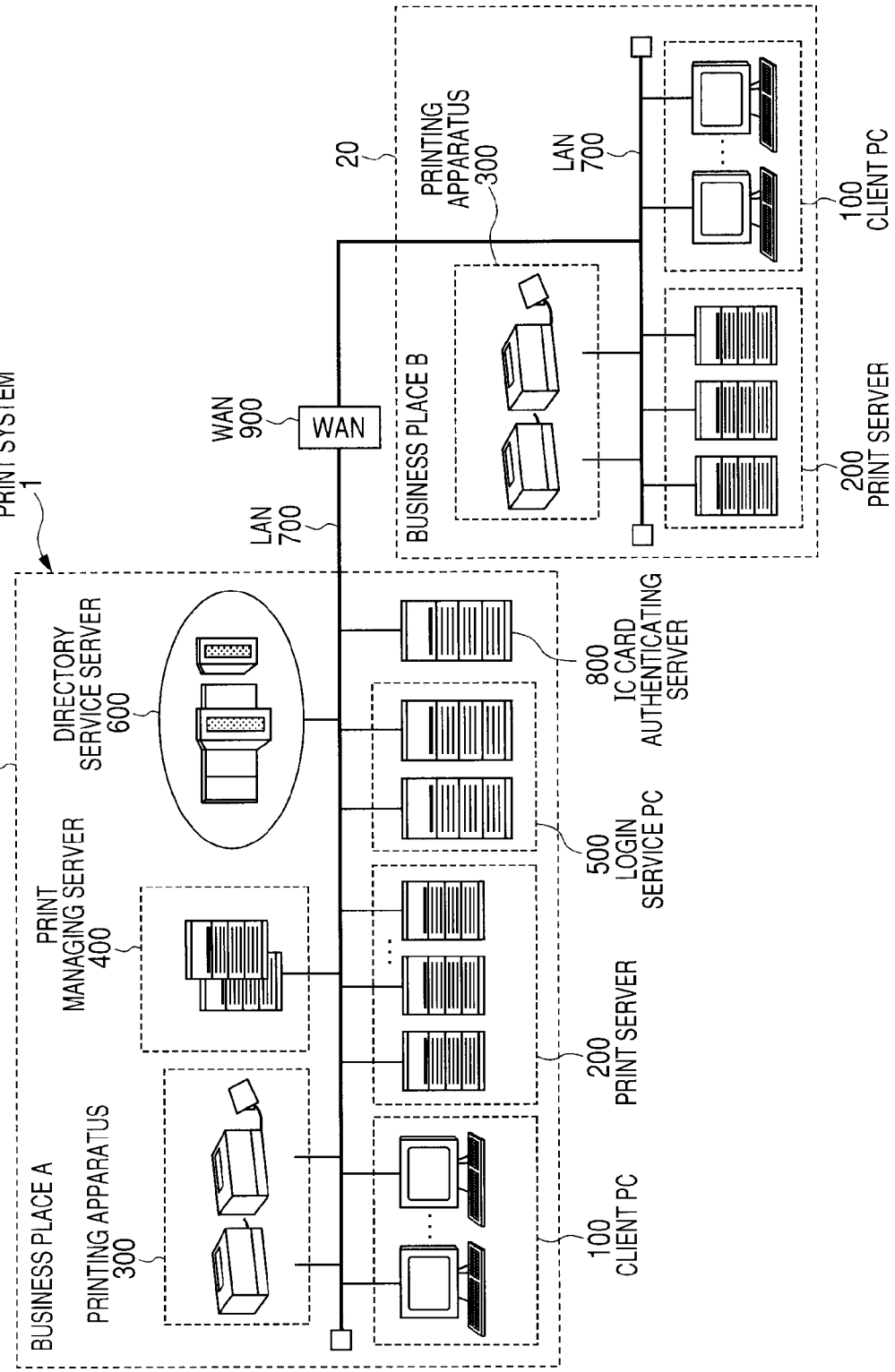
FIG. 1 is a system configuration diagram illustrating an example of a configuration of a print system 1 to which an image processing apparatus according to the present invention is applicable.

FIG. 1 is a system configuration diagram illustrating an example of a configuration of a print system (image processing system) 1 to which an image processing apparatus according to the present invention is applicable.

As illustrated in FIG. 1, a business place A10 of the print system 1 is arranged such that one or more client PCs 100 (for example, one for each user), one or more print servers 200 (for example, one for each floor of an office building), one or more printing apparatuses (image processing apparatuses) 300 (for example, one for each floor of an office building), a print managing server 400, one or more login service PCs 500 (for example, one for each floor of an office building), a directory service server 600, and an IC card authenticating server 800 are connected via a local area network (LAN) 700.

A printer driver is installed in the client PC 100. The printer driver is capable of forming print data based on data received from an application program, sending the print data to the print server 200 and the like, and storing the print data in a predetermined storage location (spool region) of the print server 200.

The print server 200 is capable of forming bibliographical information corresponding to the print data received from the client PC 100, sending the bibliographical information to the print managing server 400, and storing the bibliographical information in a predetermined storage location of the print managing server 400. In addition, based on a command for executing an LPR (Line PRinter daemon protocol) received from the outside, the print server 200 executes transfer-control of print data stored in the predetermined storage location to the printing apparatus 300.

Bibliographical information is to be formed from bibliographical information such as a login user name, a print data storing server IP address, a time stamp, and the like included in the header of print data when printing is carried out by the printer driver of the client PC 100.

The print managing server 400 includes a bibliographical information DB (database). The print managing server 400 receives, from the print server 200, bibliographical information corresponding to print data accumulated in the print server 200, and stores and manages the bibliographical information using the bibliographical information DB.

In addition, in response to a print request (a print request regarding print data corresponding to bibliographical information managed by the bibliographical information DB) from the printing apparatus 300, the print managing server 400 issues a print instruction regarding the print data to the print server 200 that is an apparatus corresponding to the IP address described in the bibliographical information.

The IC card authenticating server 800 stores a table for IC card authentication (illustrated in FIG. 5, to be described later), and in response to an IC card authentication request from the printing apparatus 300, performs an authentication process using the table for IC card authentication.

The login service PC 500 performs, as a login service of the printing apparatus 300, an authentication process (SSO or Single-Sign-On) based on a login user name and a password (for example, a login user name and a password for Windows (registered trademark) of Microsoft Corporation) of the client PC 100 stored and managed by the directory service server 600. The login service PC 500 is, for example, a personal computer mounted with the SecurityAgent service by Canon Inc.

The directory service server 600 unifies storage and management of hardware resources such as servers, clients, printers and the like existing on the network as well as attributes of users (including a login user name and a password (for example, a login user name and a password for Windows (registered trademark) of Microsoft Corporation) of the client PC 100) using such hardware resources and information such as access rights. The directory service server 600 is, for example, a server mounted with the Active Directory function.

In addition, the print system 1 may alternatively be arranged such that the business place A10 arranged as described above is connected via a WAN (wide area network) 900 to one or more business places B20 in which one or more client PCs 100, one or more print servers 200, and one or more printing apparatuses 300 are connected via the LAN 700.

Moreover, the printing apparatus 300 can be arranged so as to separately retain a table for IC card authentication (FIG. 5) therein, and when authentication cannot be made by the IC card authenticating server, authentication is performed instead using the table for IC card authentication in the printing apparatus 300.

In addition, while IC card authentication is arranged so as to be performed by the IC card authenticating server 800, the IC card authenticating server 800 may be integrally structured with the print managing server 400. Furthermore, the IC card authenticating server 800 may be arranged so as to collaborate with the login service PC 500 to have the login service PC 500 execute authentication. In this case, if authentication is made by the login service PC 500 and a determination of a normal user is made, the print managing server 400 does not reference the table for IC card authentication.

While FIG. 1 illustrates the print server 200, the print managing server 400, and the IC card authenticating server 800 as having separate chassis, all of the servers or any two servers can be integrated into the same chassis. Various structures can be adopted according to the form in which the print system 1 according to the present invention is deployed. For example, advantages similar to those achievable by the present embodiment can be achieved by operating the print server 200 and the print managing server 400 as a single-chassis print managing server.

Next, a hardware configuration of an information processing apparatus applicable to the client PC 100, the print server 200, the print managing server 400, the login service PC 500, the directory service server 600, and the IC card authenticating server 800 illustrated in FIG. 1 will be described with reference to FIG. 2.

Figure 2:
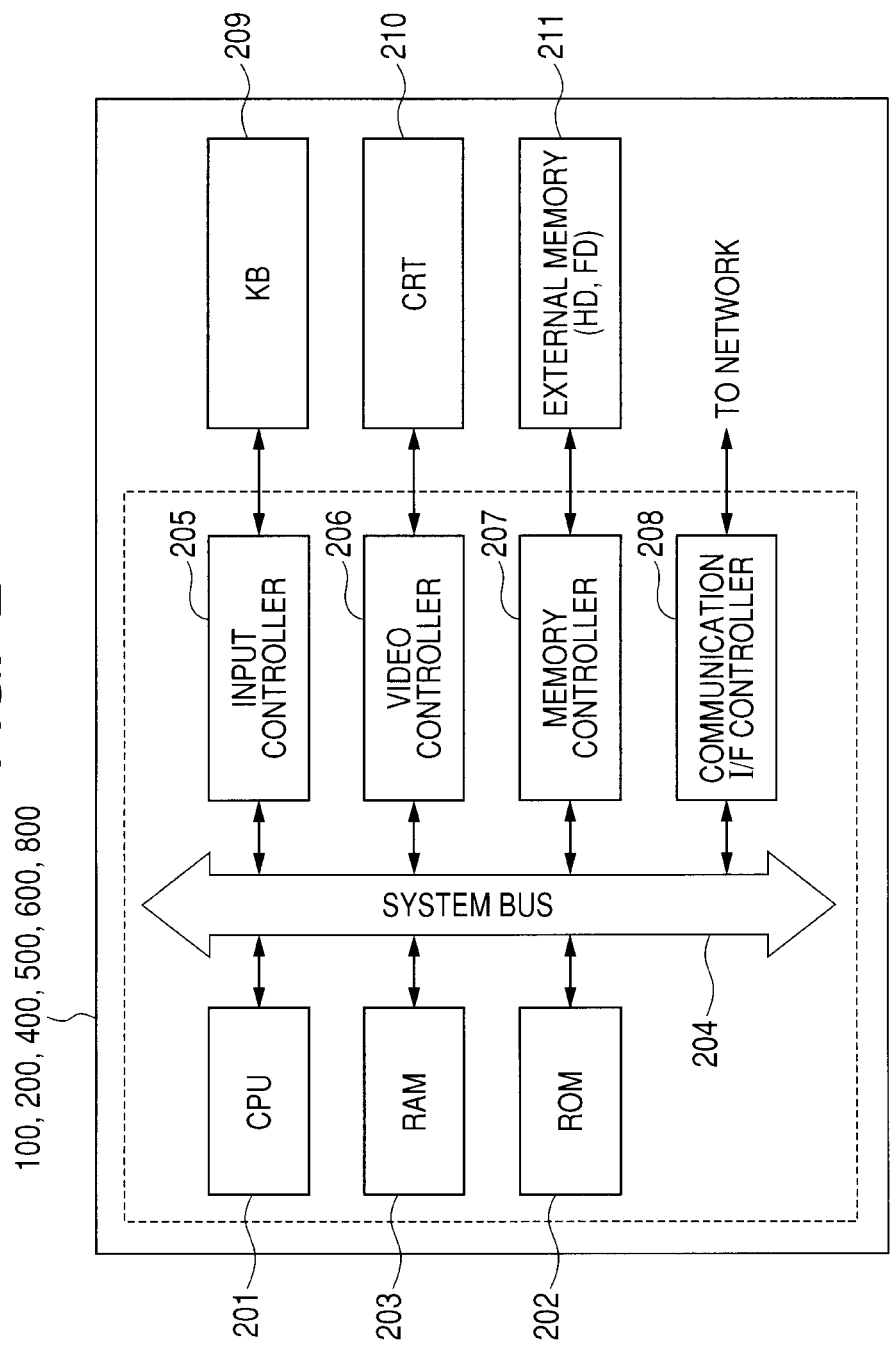
FIG. 2 is a block diagram illustrating a hardware configuration of an information processing apparatus applicable to a client PC 100, a print server 200, a print managing server 400, a login service PC 500, a directory service server 600, and an IC card authenticating server 800.

FIG. 2 is a block diagram illustrating a hardware configuration of an information processing apparatus applicable to the client PC 100, the print server 200, the print managing server 400, the login service PC 500, the directory service server 600, and the IC card authenticating server 800 illustrated in FIG. 1.

In FIG. 2, a CPU (central processing unit) 201 controls the respective devices and controllers connected to a system bus 204. In addition, a ROM (read only memory) 202 or an external memory 211 stores a BIOS (basic input/output system) that is a control program of the CPU 201, an operating system program (hereinafter referred to as an OS), various programs necessary for realizing functions executed by the respective servers and PCs, and the like to be described later.

A RAM (random access memory) 203 functions as a main memory, a work area, and the like of the CPU 201. Upon process execution, the CPU 201 loads a necessary program or the like onto the RAM 203 from the ROM 202 or the external memory 211, and realizes various operations by executing the loaded program.

An input controller 205 controls input from a keyboard (KB) 209 or a pointing device or the like such as a mouse, not shown. A video controller 206 controls display on a display such as a CRT (cathode ray tube) display (CRT) 210 or the like. While the display is denoted as a CRT 210 in FIG. 2, the display need not necessarily be a CRT and other displays such as a liquid crystal display may be used instead. The displays are to be used as necessary by an administrator.

A memory controller 207 controls access to an external storage device such as a hard disk (HD) that stores a boot program, various applications, font data, user files, edit files, various data, and the like, a flexible disk (FD), or the external memory 211 such as a Compact Flash (registered trademark) to be connected via an adapter to a PCMCIA (Personal Computer Memory Card International Association) card slot.

A communication I/F (interface) controller 208 is for connecting to and communicating with an external device via a network such as the LAN 700 illustrated in FIG. 1, and executes a network communication control process. For example, communication using TCP/IP (Transmission Control Protocol/Internet Protocol) is enabled.

Moreover, the CPU 201 enables display on the CRT 210 by executing a rasterizing process of outline fonts to, for example, a display information region in the RAM 203. In addition, the CPU 201 enables user instructions to be issued using a mouse cursor or the like, not shown, on the CRT 210.

Various programs, to be described later, for realizing the present invention are stored in the external memory 211 and are to be executed by the CPU 201 by loading the programs onto the RAM 203 as necessary. Furthermore, definition files and various information tables to be used when executing the programs are also stored in the external memory 211 and will also be described in detail later.

Next, a hardware configuration of a controller unit (network interface apparatus) 316 that controls the printing apparatus 300 as an image processing apparatus according to the present invention will be described with reference to FIG. 3. The printing apparatus 300 may be a multifunctional peripheral (MFP) or a standard printer.

Figure 3:
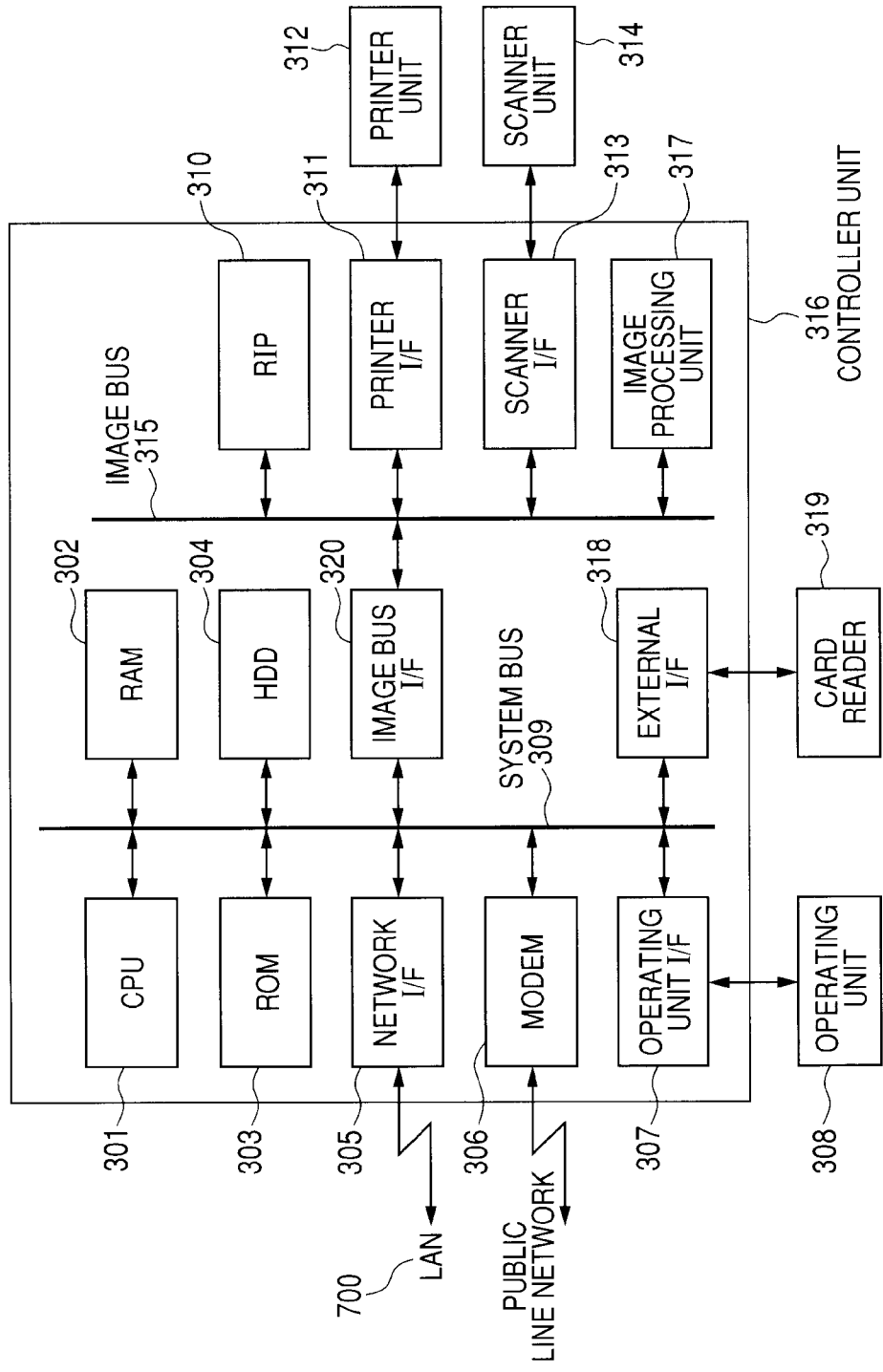
FIG. 3 is a block diagram illustrating an example of a hardware configuration of a controller unit 316 of a printing apparatus 300.

FIG. 3 is a block diagram illustrating an example of a hardware configuration of the controller unit 316 of the printing apparatus 300 illustrated in FIG. 1.

In FIG. 3, the controller unit 316 performs input/output of image data and device information by connecting to a printer unit 312 that functions as an image output device and to a LAN such as the LAN 700 illustrated in FIG. 1 or a public line (WAN) such as a PSTN (public switched telephone network) or an ISDN (Integrated Services Digital Network).

In the controller unit 316, a CPU 301 is a processor that controls the entire system. A RAM 302 is a system work memory for operations performed by the CPU 301. The RAM 302 also acts as a program memory for storing programs and an image memory for temporarily storing image data.

A ROM 303 stores a system boot program and various control programs. An HDD (hard disk drive) 304 is an external storage device that stores various programs for controlling the system, image data, and the like. In addition, the HDD 304 stores the table for IC card authentication 50 illustrated in FIG. 5.

An operating unit I/F 307 is an interface unit with an operating unit (UI) 308 and outputs, to the operating unit 308, image data to be displayed on the operating unit 308. In addition, the operating unit I/F 307 conveys information such as user information and the like input by a user of the present system from the operating unit 308 to the CPU 301.

The operating unit 308 includes a display unit having a touch panel. By pressing (touching with a finger or the like) buttons displayed on the display unit, a user can issue various instructions.

A network I/F 305 connects to a network such as the LAN 700 and performs data input/output.

A modem 306 connects to a public line network and performs data input/output such as sending and receiving faxes.

An external I/F 318 is an interface unit that receives external input such as a USB (universal serial bus), IEEE (Institute of Electrical and Electronic Engineers) 1394, a printer port, RS232C (Recommended Standard 232 Version C), and the like. A card reader 319 for reading an IC card that becomes necessary for authentication is connected to the external I/F 318. The CPU 301 is capable of controlling reading of information from an IC card using the card reader 319 via the external I/F 318 and obtaining information read from the IC card.

The devices described above are disposed on a system bus 309.

An image bus I/F 320 is a bus bridge that connects the system bus 309 with an image bus 315 for transferring image data at high speed, and converts data structures.

The image bus 315 is made up of a PCI (peripheral component interconnect) bus or an IEEE 1394. The following devices are disposed on the image bus 315.

An RIP (raster image processor) 310 develops vector data such as a PDL (page description language) code into a bitmap image.

A printer I/F 311 connects a printer unit 312 with the controller unit 316 and performs synchronous/asynchronous conversion of image data. In addition, a scanner I/F 313 connects a scanner unit 314 with the controller unit 316 and performs synchronous/asynchronous conversion of image data.

An image processing unit 317 corrects, processes and edits input image data, and performs printer correction, resolution conversion and the like on print output image data. In addition, the image processing unit 317 rotates image data, and performs compression/expansion in JPEG on multivalued image data and in JBIG, MMR, MH and the like on binary image data.

The scanner unit 314 illuminates an image on paper to become an original document. By scanning the image with a CCD line sensor, the scanner unit 314 converts the image as raster image data into an electric signal. The original document is set in a tray of a document feeder. When a read activation instruction is issued by a user of the apparatus from the operating unit 308, the CPU 301 issues an instruction to the scanner unit 314, whereby the feeder feeds the original document a sheet at a time to read images on the original document.

The printer unit 312 is an element that converts raster image data into an image on paper. Any system can be employed by the printer unit 312, including an electrophotographic system using a photoreceptive drum or a photoreceptive belt and an inkjet system in which ink is discharged from a minute nozzle array to directly print images on paper. A print operation is activated by an instruction from the CPU 301. The printer unit 312 is provided with a plurality of paper-feed steps and corresponding paper cassettes so as to enable selection of different paper sizes or different paper orientations.

When the printing apparatus 300 is an MFP, the operating unit 308 includes an LCD (liquid crystal display) display unit with a touch panel sheet attached on the LCD. Besides displaying operation display screens of the system, when a displayed key is pressed, the operating unit 308 conveys positional information of the key to the CPU 301 via the operating unit I/F 307.

In addition, the operating unit 308 includes various operating keys such as a start key, a stop key, an ID key, and a reset key. In this case, the start key of the operating unit 308 is used, for instance, to start a read operation on an image on an original document. A two-color LED of red and green is positioned at the center of the start key to indicate, through color, whether the start key is enabled or not. The stop key of the operating unit 308 stops an operation in progress. The ID key of the operating unit 308 is used when inputting a user's user ID. The reset key is used when initializing settings from the operating unit.

When the printing apparatus 300 is a standard printer, the operating unit 308 is provided with a smaller LCD display unit than that for the MFP and simple hard keys such as arrow keys.

A card reader 319 reads information stored in an IC card (for example, FeliCa (registered trademark) by Sony Corporation) under the control of the CPU 301, and notifies the read information to the CPU 301 via the external I/F 318.

Although the card reader 319 has been included since IC cards are to be used, authentication can be performed using fingerprints or finger veins instead of IC cards. In such a case, the present invention can be realized by replacing the card reader 319 with a fingerprint reader or a finger vein reader.

Through the arrangement described above, the printing apparatus 300 is capable of printing and outputting, through the printer unit 312, print data received from the LAN 700.

In addition, the printing apparatus 300 is also capable of sending image data read by the scanner unit 314 over a public line via the modem 306 in the form of a fax, or outputting image data received from the public line in the form of a fax through the printer unit 312.

Next, a flow of a printing process by the print system 1 according to the present invention will be described with reference to FIGS. 4 to 17.

The flow of a printing process by the print system 1 according to the present invention will be described with reference to two embodiments, namely, a use case involving two users (first embodiment) and a use case involving three or more users (second embodiment). In either case, the print system 1 is to be arranged as described above.

First Embodiment

For the first embodiment, a convenient interruption printing method will be described which requires that a user (second user) to perform interruption printing obtain approval from a user under printing (first user) when print data of the first user under printing is set to interruption inhibition. First, a flow of a printing process by the print system 1 according to the present invention in a use case of two persons will be described with reference to FIGS. 4 to 14.

Figure 7:
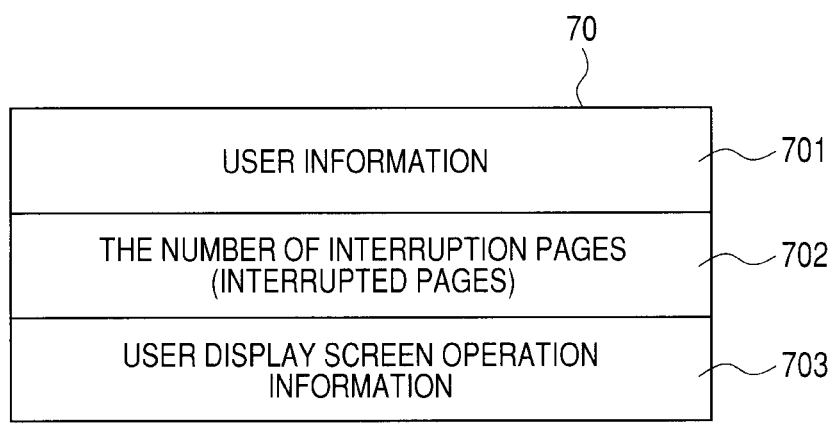
FIG. 7 is a first data configuration diagram illustrating an example of memory data.
Figure 8:
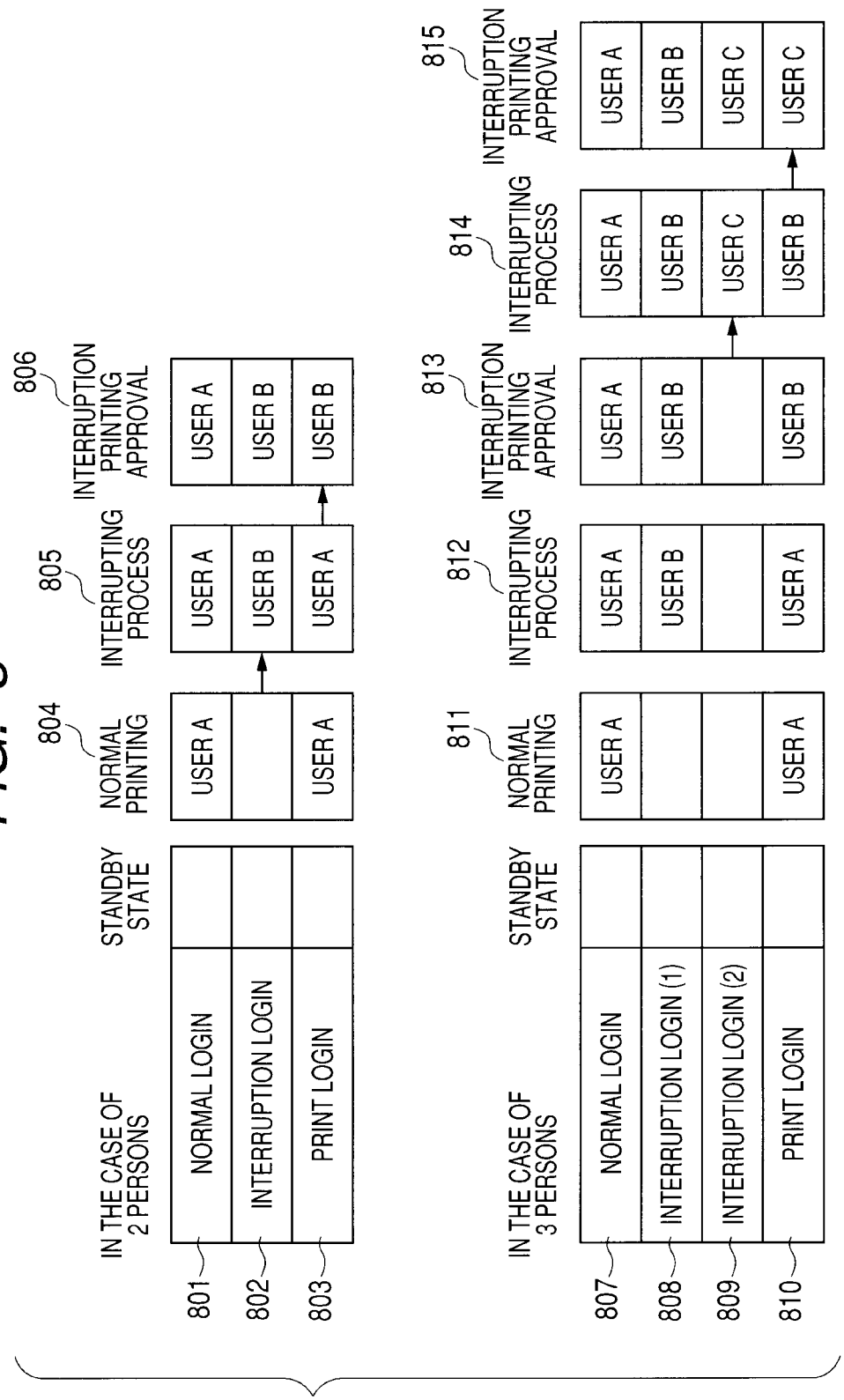
FIG. 8 is a second data configuration diagram illustrating an example of memory data.
Figure 9:
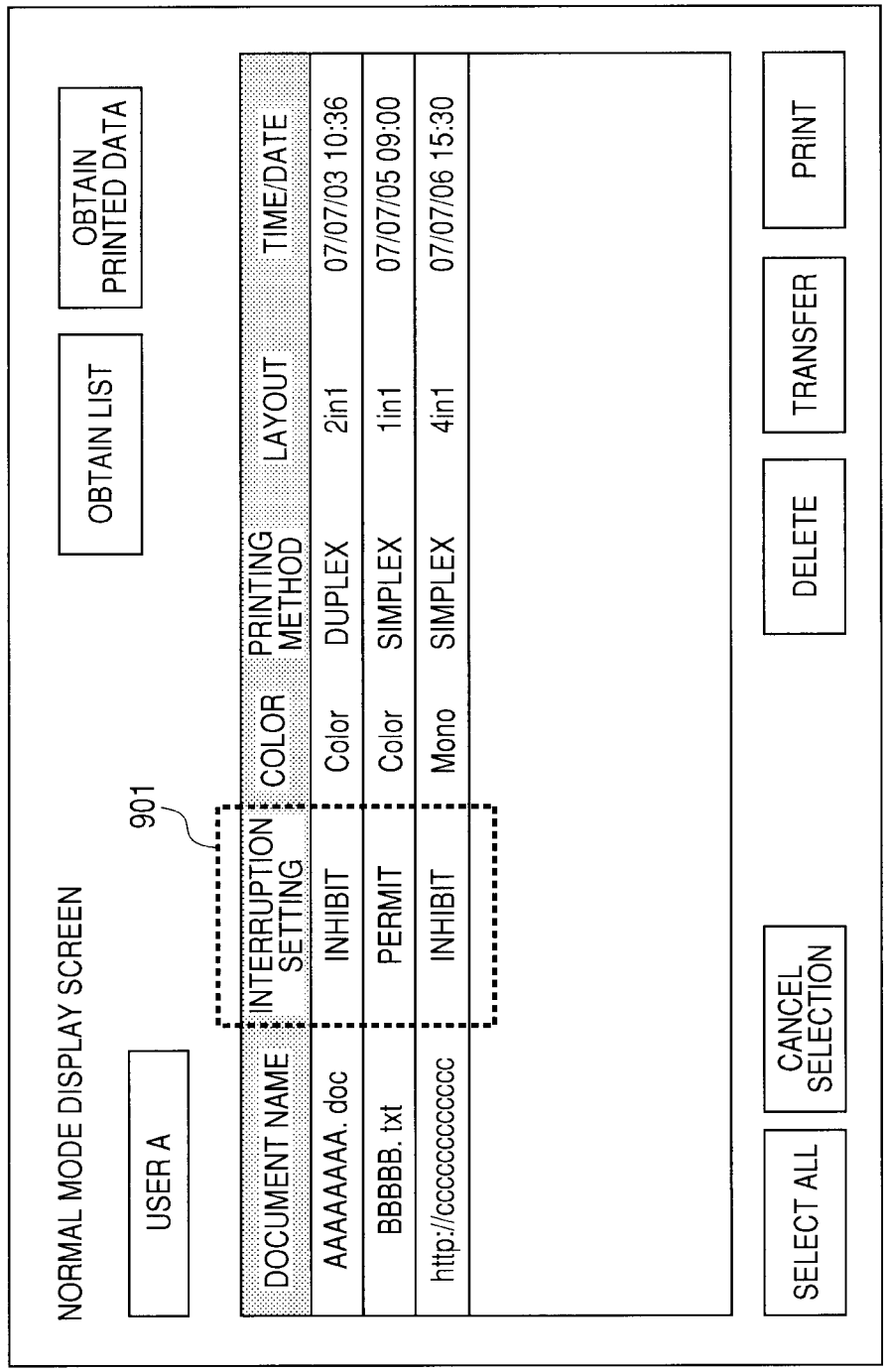
FIG. 9 is a first diagram illustrating an example of a user display screen.
Figure 10B:
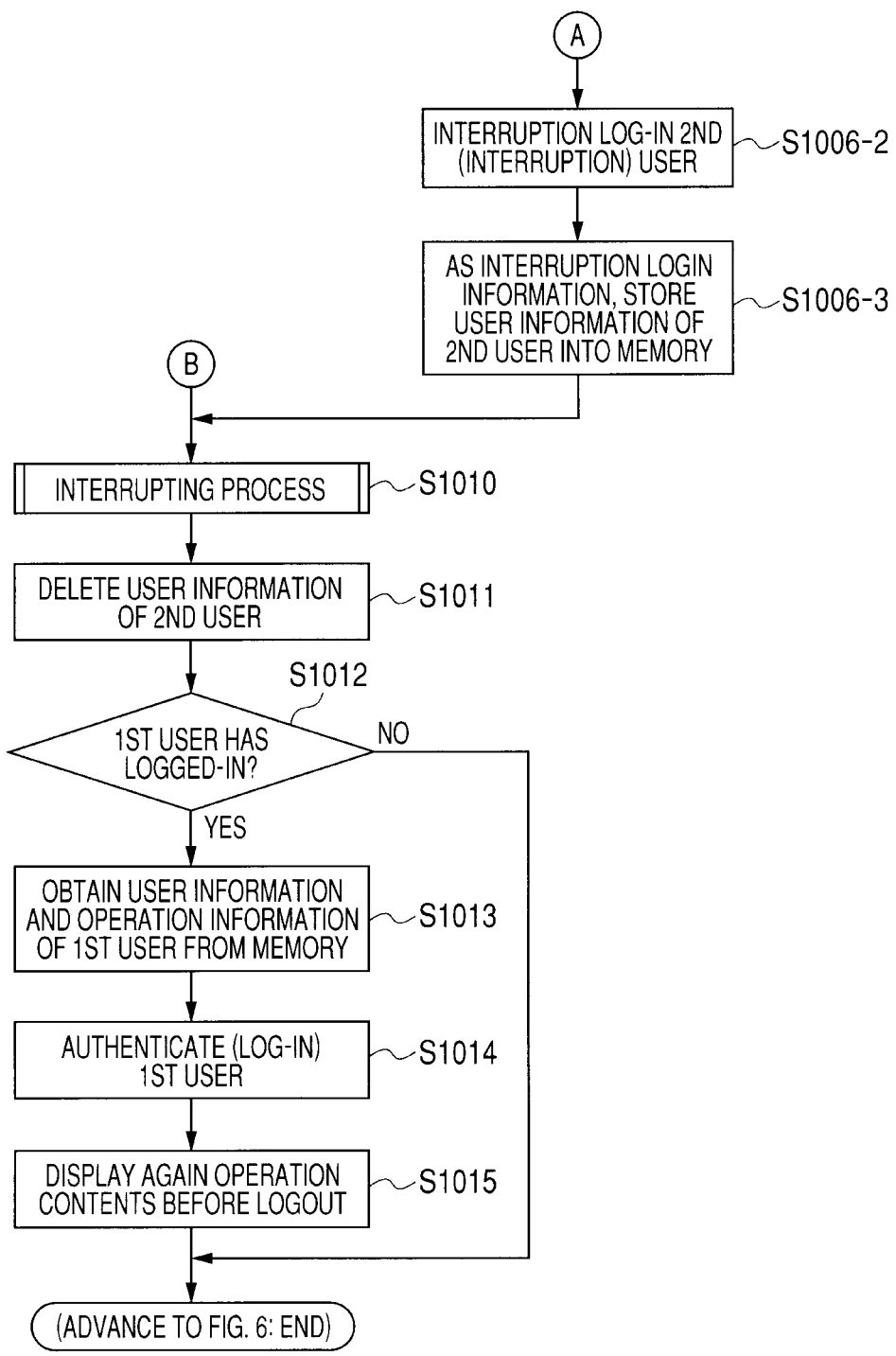
FIG. 10 is comprised of FIGS. 10A and 10B showing first flowcharts illustrating an example of a process procedure of the first interruption print mode.
Figure 11:
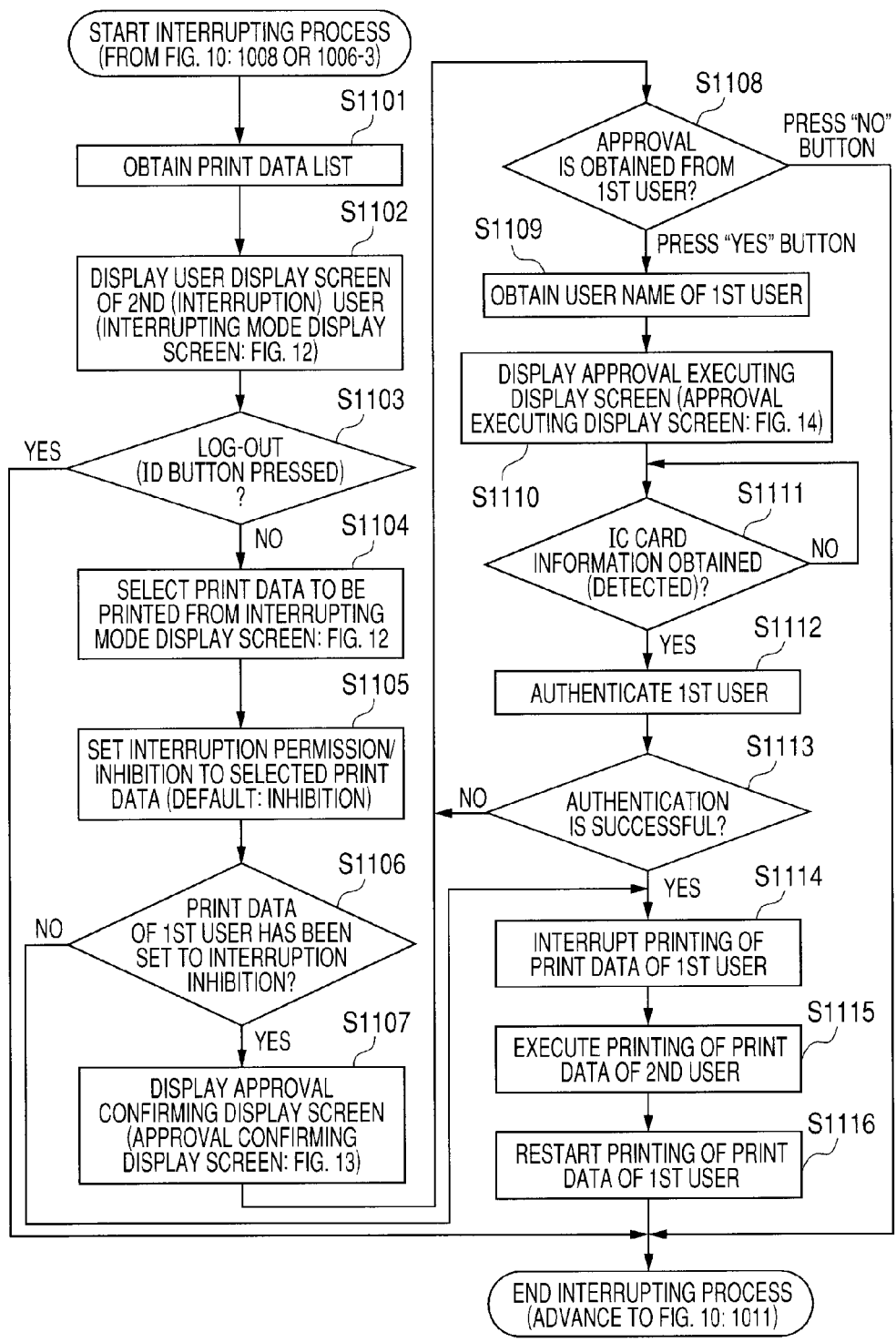
FIG. 11 is a second flowchart illustrating an example of a process procedure of the first interruption print mode.
Figure 12:
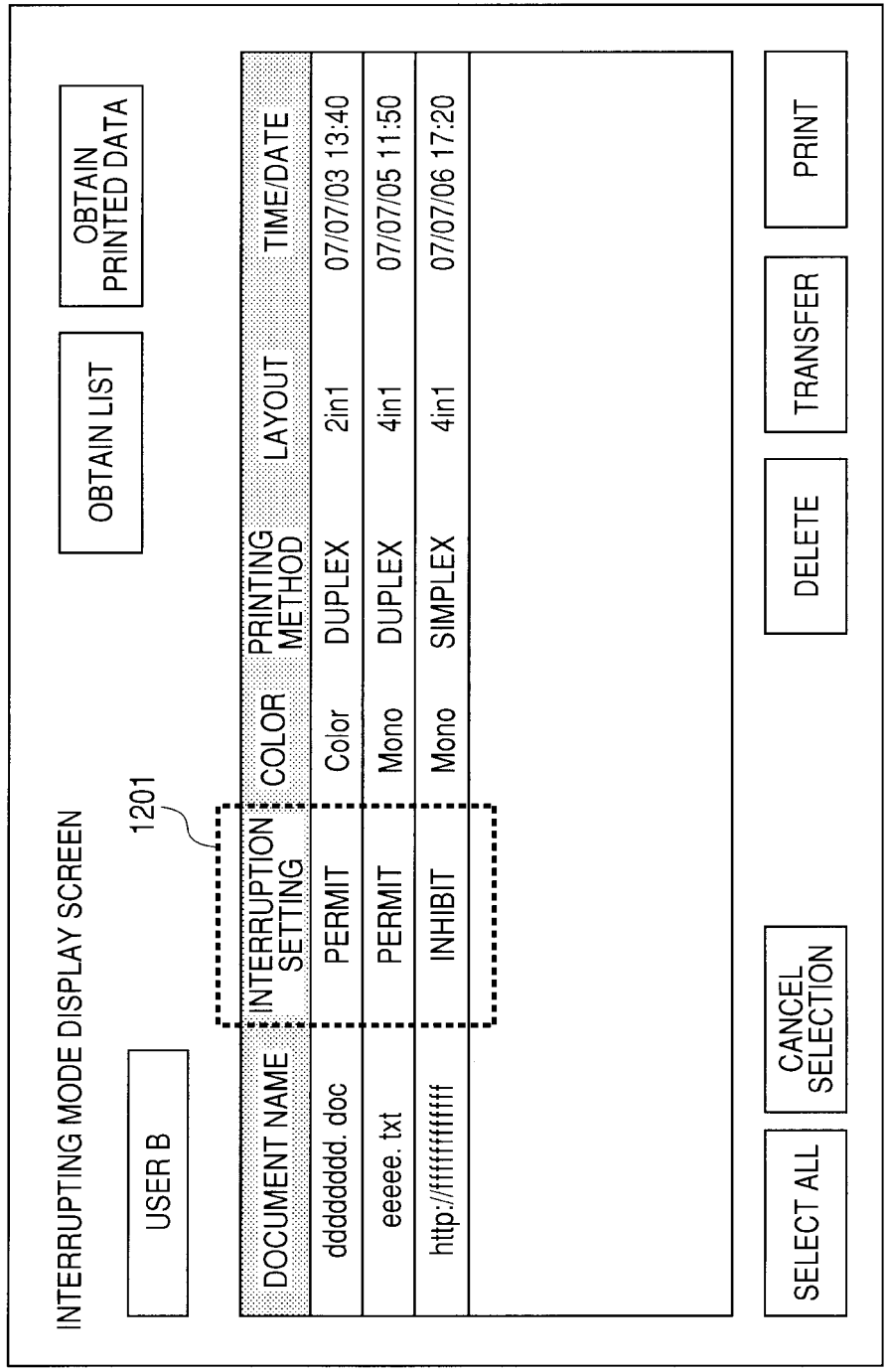
FIG. 12 is a second diagram illustrating an example of a user display screen.
Figure 13:
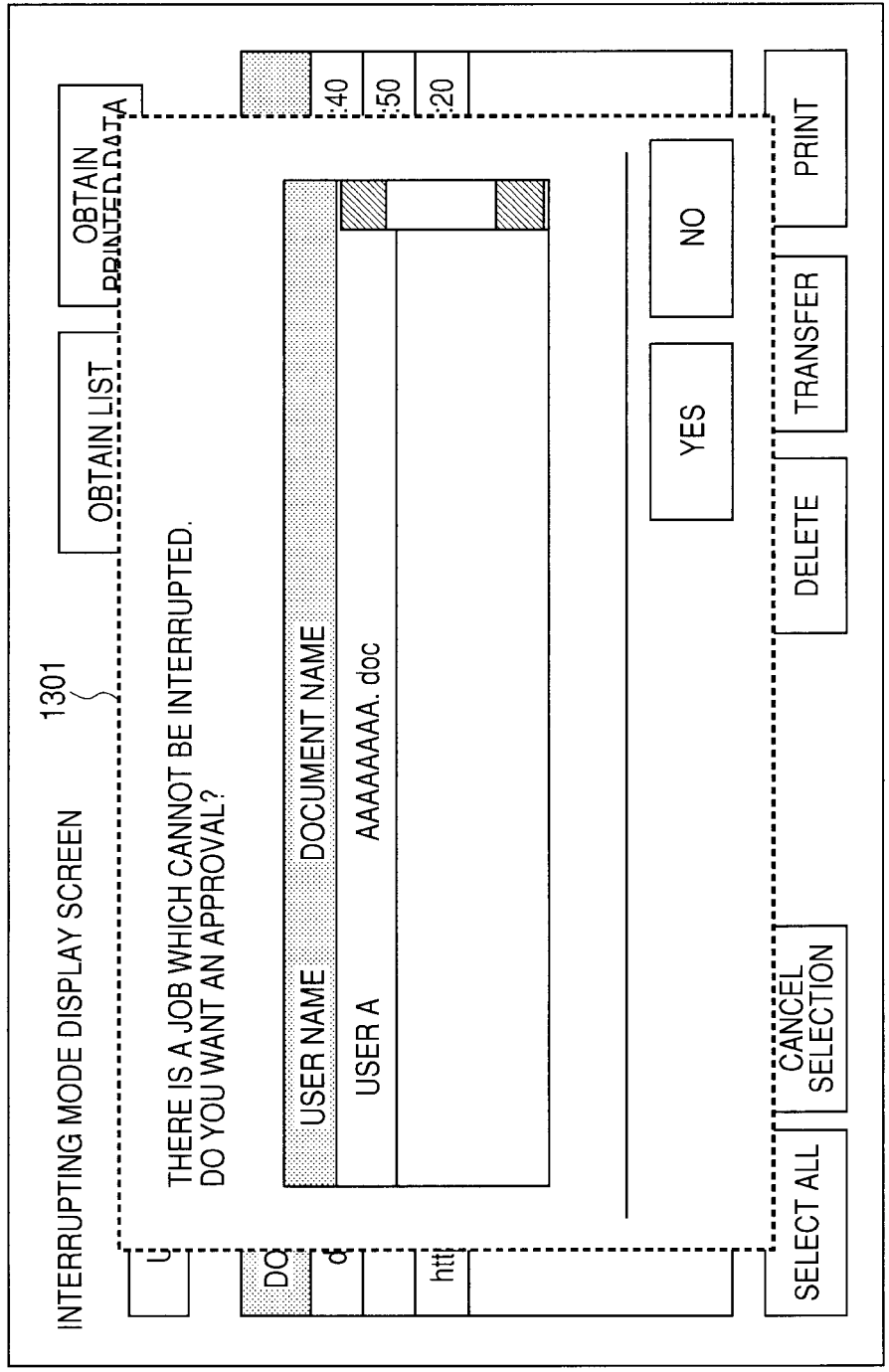
FIG. 13 is a third diagram illustrating an example of a user display screen.
Figure 14:
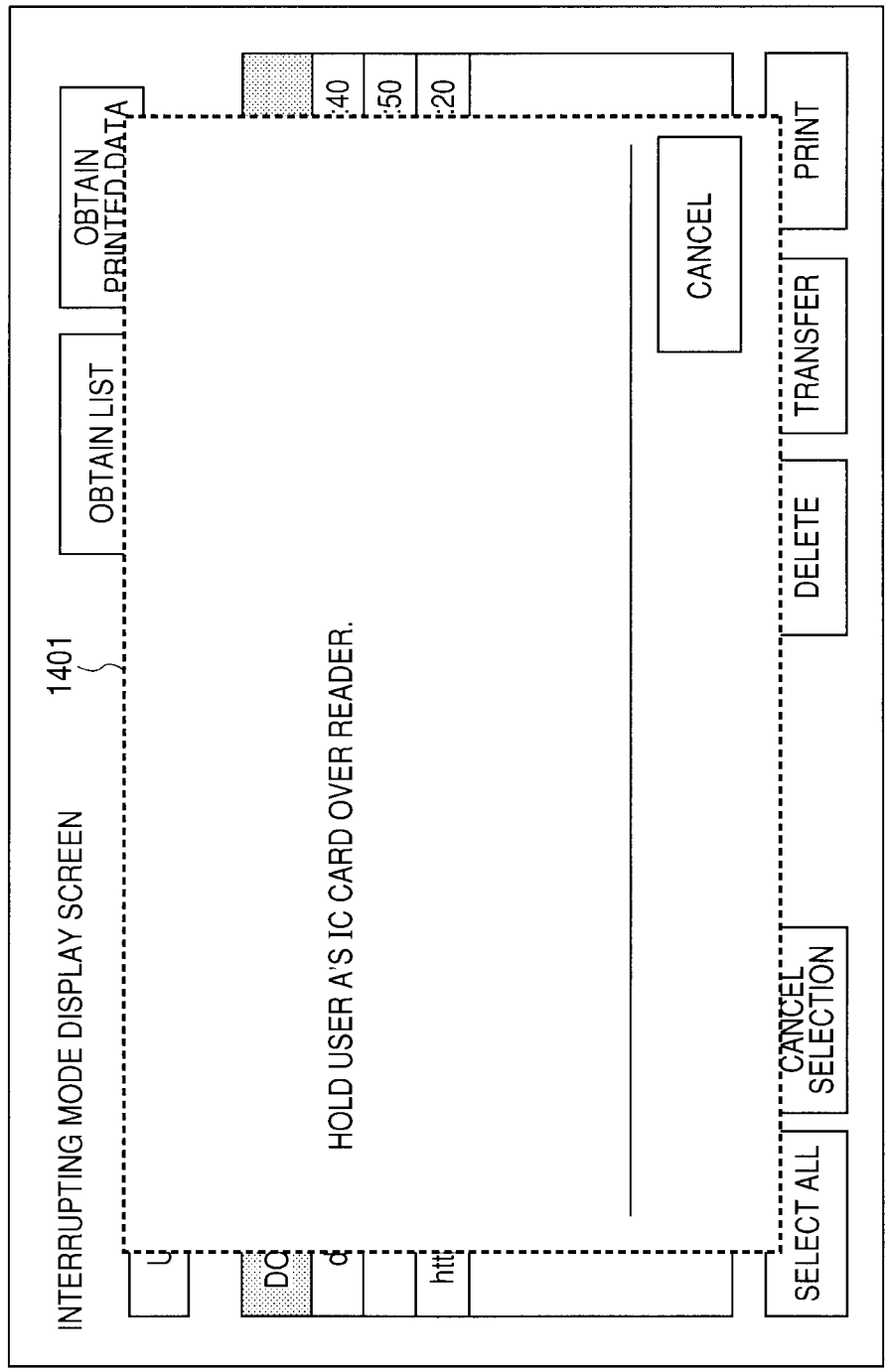
FIG. 14 is a fourth diagram illustrating an example of a user display screen.

FIG. 4 is a data configuration diagram illustrating an example of bibliographical information 40. FIG. 5 is a data configuration diagram illustrating an example of a table for IC card authentication 50. FIGS. 6A and 6B are flowcharts illustrating an overall flow of a printing process of the print system 1. FIG. 7 is a first data configuration diagram illustrating an example of memory data. FIG. 8 is a second data configuration diagram illustrating an example of memory data. FIG. 9 is a first diagram illustrating an example of a user display screen. FIGS. 10A and 10B are first flowcharts illustrating an example of a procedure of an interruption control process. FIG. 11 is a second flowchart illustrating an example of a procedure of an interruption control process. FIG. 12 is a second diagram illustrating an example of a user display screen. FIG. 13 is a third diagram illustrating an example of a user display screen. FIG. 14 is a fourth diagram illustrating an example of a user display screen.

In the flowchart illustrated in FIGS. 6A and 6B, a user first logs-in to the client PC 100. From an application program executed on the client PC 100, the user issues a print instruction to a logical printer corresponding to a printer driver set as the print destination.

In response to the print instruction, the application program of the client PC 100 sends data to the printer driver via a graphic engine. The printer driver of the client PC 100 forms print data based on the data received from the application program via the graphic engine (step S601). The client PC 100 sends the formed print data to the print server 200 (step S602). The print server 200 stores the print data in a predetermined storage location (step S603).

Print data is sent from the client PC 100 to the print server 200 using, for example, the mechanism of LPR printing. In addition, the print server 200 does not send print data to the print apparatus at this point even when the print data is stored in the predetermined storage location.

Next, the print server 200 extracts and forms bibliographical information 40 illustrated in FIG. 4 from the print data received from the client PC 100 and stored in the predetermined storage location (step S604). The print server 200 sends the extracted and formed bibliographical information 40 to the print managing server 400 (step S605), and causes the print managing server 400 to store the bibliographical information 40 in a predetermined storage location (a preset directory) in the print managing server 400 using a mechanism for sharing files over the network (step S606).

Bibliographical information will now be described with reference to FIG. 4.

As illustrated in FIG. 4, bibliographical information 40 is made up of information such as a login user name 401, a print data storing server IP address 402, a path of print data 403, a document name 404, the number of print copies 405, the number of pages 406, the presence or absence of error 407, a time stamp 408, permission or inhibition of interruption printing 409, and the number of interruption permitted jobs 410.

A login user name 401 represents, for example, a login user name of the client PC 100.

A print data storing server IP address 402 represents an IP address of the print server 200 storing corresponding print data.

A path of print data 403 represents a full path indicating a storage location of corresponding print data.

A document name 404 represents a document name of corresponding print data.

The number of print copies 405 represents the number of print copies of corresponding print data.

The number of pages 406 represents the number of pages of corresponding print data.

The presence or absence of error 407 represents whether or not an error has occurred during the printing of corresponding print data and is set to "absent" upon formation of bibliographical information.

A time stamp 408 is assigned when print data is received by the print server 200 and represents a time and data of reception of corresponding print data.

Permission or inhibition of interruption printing 409 is to be set in step S601 upon issuing a print instruction to permit or inhibit interruption of a job (print data) under printing.

The number of interruption permitted jobs 410 is also set in step S601 upon issuing a print instruction to specify a maximum number of interruption permitted jobs when "permit interruption" is set for permission or inhibition of interruption printing 409. Although a maximum number of jobs is to be set in the present example, a determination can be made based instead on a maximum number of pages or the like.

The description of the overall print system 1 will now resume.

The print managing server 400 monitors the predetermined directory. When bibliographical information is stored in the predetermined directory by the print server 200, the print managing server 400 analyzes and registers the bibliographical information 40 in a bibliographical information DB constructed on an external storage device of the print managing server 400. Moreover, permission or inhibition of interruption printing 409 and the number of interruption permitted jobs 410 illustrated in FIG. 4 may be arranged so as to be formed by the print managing server 400.

On the other hand, upon detecting an IC card readable by the card reader 319, the printing apparatus 300 reads personal authentication information in the IC card (step S607), and sends the read personal authentication information as an authentication request to the IC card authenticating server 800 (step S608). Personal authentication information is information to be used for authentication and may be a manufacturing number of the IC card.

Moreover, in an operation in which the possession of an IC card is deemed positive, an arrangement can be adopted in which a login user name (user identification information) is retained in an IC card and the processes in steps S609 to S611, to be described later, are not performed.

Upon receiving personal authentication information from the printing apparatus 300 (step S609), the IC card authenticating server 800 performs authentication of the personal authentication information based on the table for IC card authentication 50 illustrated in FIG. 5 and stored on an external storage device of the IC card authenticating server 800, and sends back an authentication result to the printing apparatus 300 (step S610). When authentication is successful, the login user name of the client PC 100 is to be sent as the authentication result.

Moreover, an alternate arrangement can be adopted in which instead of performing authentication with the IC card authenticating server 800, authentication information is retained and authentication is performed in the printing apparatus 300.

The table for IC card authentication will now be described with reference to FIG. 5.

As illustrated in FIG. 5, the table for IC card authentication 50 is made up of information such as a card manufacturing number 501, a user name 502, an e-mail address 503, a division ID 504, a division password 505, and administrator authority 506.

A card manufacturing number 501 represents, for example, a manufacturing number of an IC card.

A user name 502 represents a login user name of the client PC 100.

An e-mail address 503 represents an e-mail address associated with the login user name.

A division ID 504 represents a division ID of a division to which the login user belongs.

A division password 505 represents a password for authentication using the division ID 504.

Administrator authority 506 represents whether or not the login user has administrator authority.

Print authority 507 represents a print authority when performing pull-print printing. When the authority is high, interruption printing can be forcibly performed even if an approval for interruption printing is not obtained from the user under printing. Authority levels may be grouped by numerical value or may be managed according to categories such as administrative positions and general office employees.

The description of the overall print system will now resume.

The printing apparatus 300 receives the user name 502 (user identification information) as an authentication result signifying a successful authentication from the IC card authenticating server 800 (step S611).

An example of data of the RAM 302 of the printing apparatus 300 will now be described with reference to FIGS. 7 and 8.

As illustrated in FIG. 7, data of the RAM 302 is made up of user information 701, the number of interrupted pages 702, and user display screen operation information 703.

User information 701 contains information necessary for user authentication. In the present embodiment, the user name 502 is stored in user information 701.

The number of interrupted pages 702 is for storing the number of interrupted pages when printing of print data is interrupted (default: 0 pages).

User display screen operation information 703 stores panel operation information of a user who has been logged in (default: user display screen).

It is assumed that the information illustrated in FIG. 7 is retained in the respective storage regions illustrated in FIG. 8 such as normal login user, interruption login user, and print login user.

User information 701 stores a user name (user identification information) of an authenticated user. In the case of normal printing, as illustrated in FIG. 8, a user name is stored as a normal login in the RAM 302 (identification information storage unit). In the case of interruption printing, a user name is stored as an interruption login in the RAM 302 (identification information storage unit).

Print login is for storing information of the user currently under printing.

The description of the overall print system will now resume.

The printing apparatus 300 subsequently performs an existence checking process in step S612.

The print system is arranged, so as to proceed to the process of step S612 when authentication is successful in step S611. However, since the printing apparatus 300 is provided with a fax transmission function for sending faxes, a scan function, a copy function, a print function and the like, the print system can be arranged so as to proceed to the process of step S612 when authentication is successful and the print function (for example, a pull-print function) is selected (executed).

Since the printing apparatus 300 is also used for functions other than the print function, by performing the process described above, a transition to an unnecessary interrupting process can be prevented when not using the print function. As a result, a convenient mechanism can be provided.

While the process performed in step S612 will be described later with reference to FIG. 10, after step S612 is completed, a user desiring to perform printing is to be stored in the RAM 302 as the normal login user and the print login user or as the interruption login user and the print login user as illustrated in FIG. 8.

Subsequently, the printing apparatus 300 sends a print data list request (obtainment request) to the print managing server 400 (step S613). It is assumed that a user name is included in the print data list request.

It is also assumed that the login user name 401 in the bibliographical information 40 illustrated in FIG. 4 and the user name 502 in the table for IC card authentication 50 illustrated in FIG. 5 share the same format, and that a list of print data can be obtained by connecting the user information.

Upon receiving a print data list request from the printing apparatus 300 (step S614), the print managing server 400 searches the bibliographical information DB using the user name included in the print data list request as a key, forms a print data list (job list) corresponding to the user name, and sends the print data list to the printing apparatus 300 (step S615).

The print data list includes a user name, a time stamp, a document name, a time and date of printing, interruption permission/inhibition information, and the number of interruption permitted print data units.

Upon receiving a print data list from the print managing server 400 (step S616), the printing apparatus 300 displays the print data list on an UI of the operating unit 308.

A display screen for displaying a print data list (normal mode display screen) will now be described with reference to FIG. 9.

The display screen illustrated in FIG. 9 includes a list display unit that displays print data so as to be selectable by touch, a print instruction unit for instructing printing, and the like.

In FIG. 9, an interruption setting unit 901 enables permission or inhibition of interruption printing of print data (whether or not interruption printing of print data of another user is to be allowed) to be set. Inhibition is the default setting.

When print data is selected by the user on the display screen illustrated in FIG. 9 and a print instruction is issued (step S617), the printing apparatus 300 sends a print request (print instruction) for the print data selected in step S617 to the print managing server 400 (Step S618).

It is assumed that the print request includes a user name and a print data time stamp. In addition, information on interruption printing permission/inhibition of the print-requested print data is to be stored in the RAM 302.

Furthermore, it is assumed that the IP address of the printing apparatus 300 is to be sent together with the print request.

In addition, in step S617, interruption printing permission/inhibition of the print data is to be set in the interruption setting unit 901 illustrated in FIG. 9.

Upon receiving a print request for print data from the printing apparatus 300 (step S619), the print managing server 400 searches bibliographical information of the print data for which the print request had been made from the bibliographical information DB using the user name and the print data time stamp as keys, identifies the print server 200 storing corresponding print data from the searched bibliographical information, and sends a print request for the corresponding print data to the print server 200 (step S620).

The print request is a print command including a corresponding time stamp and document name. The IP address of the printing apparatus 300 is sent together with the print request.

In addition, the aforementioned time stamp is attached when the print server 200 receives print data in step S603.

Upon receiving a print request from the print managing server 400 (step S621), the print server 200 sends print data to the printing apparatus 300 based on the print request (step S622). The printing apparatus 300 receives the print data, prints the received print data by LPR printing (step S623), and completes printing (step S624).

An interruption control process performed in a pull-print system according to the present embodiment will now be described with reference to FIGS. 10A to 14.

The interruption control process of the printing apparatus 300 described hereafter is to be realized by the CPU 301 of the printing apparatus 300 by loading a program stored in the ROM 303 or the HDD 304 onto the RAM 302 and executing the program.

In the process to be performed in step S612 illustrated in FIGS. 6A and 6B, first, in step S1001 of the flowchart illustrated in FIG. 10, a discrimination is made on whether or not a user currently normally logged-in to the printing apparatus 300 (first user) exists or not, in other words, whether the first user has normally logged in or not (step S1001). The discrimination is made based on whether or not user information 701 exists in the storage region of normal login 801 illustrated in FIG. 8.

When user information 701 exists in the storage region of normal login 801, the printing apparatus 300 discriminates that the first user is in a normal login state and advances the process to step S1002. If user information 701 does not exist in the storage region of normal login 801, the printing apparatus 300 discriminates that the first user is not in a normal login state and advances the process to step S1006-1 to be described below.

User information 701 exists when, as represented by reference numeral 804 in FIG. 8, a user A has already logged-in to the printing apparatus 300 as a normal user. In other words, the first user in this case refers to the user A of normal login 801 represented by reference numeral 804 in FIG. 8. In this case, a user attempting to print (second user) becomes a user B to perform interruption printing.

In step S1002, display screen information currently displayed on the operating unit 308 is stored in user display screen operation information 703 corresponding to the user information of the first user of the RAM 302 (step S1002).

The display screen information stores, for example, a display screen ID in order to restore the display screen previously operated by the normal login user upon conclusion of an interrupting process.

A display screen ID corresponds to, for example, a display screen (resource data) stored in the HDD 304 of the printing apparatus 300 to be displayed on the operating unit 308.

Subsequently, the first user is logged-out from the printing apparatus 300 (step S1003). Upon this logout, user information 701 of normal login 801 is not deleted.

Next, the user to perform interruption printing (second user) is logged-in to the printing apparatus 300 as an interruption user (step S1004), and the user name (user information) of the second user is stored in user information 701 of interruption login 802 of the RAM 302 (identification information storage unit) (step S1005).

Subsequently, in step S1008, a determination is made (print discrimination) on whether the first user (normal login user) is under printing. If the first user is under printing, the process advances to step S1010 to be described later, and if not, the process advances to step S1009. The determination of whether printing is in progress or not is made based on whether or not a corresponding user name exists in user information 701 of print login 803 illustrated in FIG. 8.

For example, as represented by reference numeral 805 in FIG. 8, if the user A exists in print login 803, it is determined that the first user is under printing and the process advances to step S1010.

On the other hand, if the user A does not exist in print login 803 represented by reference numeral 805 illustrated in FIG. 8, the process advances to step S1009. When the process advances to step S1009, an interrupting process need not be performed since printing is not in progress.

In step S1009, the user name of the second user is stored in user information 701 of print login 803 of the RAM 302 and the process is completed. Subsequently, the process advances to step S613 illustrated in FIGS. 6A and 6B described earlier and enters a flow of operations for printing.

In step S1006-1, in the discrimination of whether or not a user name exists in user information 701 of print login 803 of the RAM 302 illustrated in FIG. 8, a discrimination is made on whether the first user (normal login user) is under printing or not (print discrimination is performed).

The discrimination is a process performed because there may be cases where a print process of the print data of the first user continues even when the first user is no longer normally logged in due to automatic logout or the like.

When the first user is under printing, the process advances to step S1006-2. If not, the process advances to step S1006, to be described below.

The process advances to step S1006 in a state where neither a normal login user nor a user under printing exist and the user attempting to print (second user) is capable of normally logging-in to the printing apparatus 300.

In step S1006-2, the second user is logged-in to the printing apparatus 300 as an interruption login user who is to perform interruption printing.

In this process, since a normal login user does not exist, the same operation as a normal login may be performed.

Subsequently, in step S1006-3, the user name (user information) of the second user included in the authentication result received in step S611 is stored in user information 701 of interruption login 802 of the RAM 302 illustrated in FIG. 8. The process then advances to step S1010, to be described later.

In this case, a state is entered where no user name is included in user information 701 of normal login 801 illustrated in FIG. 8.

On the other hand, in step S1006, the user attempting to print (second user) is logged in as a normal login user. In other words, the user attempting to print in this case is the user A of normal login 801 represented by reference numeral 804 illustrated in FIG. 8. In the present embodiment, "login" means logging-in to the printing apparatus 300 with the user name received in step S611 through notification (login instruction) of the user name to an OS (operating system) of the printing apparatus 300 so as to allow the user access to the functions of the printing apparatus 300.

Subsequently, in step S1007, the user name of the second user is stored as a normal login user in user information 701 of normal login 801 of the RAM 302 illustrated in FIG. 8.

The process then advances to step S1009 described earlier.

In step S1010, an interrupting process is performed. Details of an interrupting process will be described later.

When the process advances to step S1010, the login user is either in a state 805 illustrated in FIG. 8 or in a state where the user A is stored in print login and the user B is stored in interruption login.

After the conclusion of the interrupting process of step S1010, the user name (user information) of the second user stored in user information 701 of interruption login 802 and in user information 701 of print login 803 illustrated in FIG. 8 is deleted (step S1011).

Alternatively, the entire data 70 corresponding to interruption login 802 may be arranged to be deleted.

In addition, the user name of the second user is deleted and the second user (interruption login user) is logged-out.

Note that the present embodiment is arranged such that the number of interrupted pages 702 and user display screen operation information 703 of interruption login 802 and print login 803 illustrated in FIG. 8 are storage regions to be used by normal login 801 and store no data, and are therefore not deleted in step S1011.

Subsequently, in step S1012, if the first user is in a normal login state, the process advances to step S1013. Otherwise, the process is terminated. The determination of whether or not the first user is in a normal login state is made based on whether or not the user name exists in user information 701 of normal login 801 illustrated in FIG. 8.

Next, in step S1013, display screen information stored in step S1002 is obtained from user display screen operation information 703 and a user name is obtained from user information 701 of normal login 801 stored in the RAM 302 illustrated in FIG. 8 (step S1013).

A re-login process of the first user is then performed using the user name obtained in step S1013 (step S1014).

Subsequently, a display screen corresponding to the display screen information obtained in step S1013 is displayed on the operating unit 308 and restored to the display state prior to the logout of the first user (step S1015), and the process is completed. After the conclusion of the process, a flow is entered where the first user restarts operations of the printing apparatus 300 based on re-displayed display screen information and performs printing.

By performing the processes of steps S1013 to S1015, the first user is no longer required to hold his/her IC card over the reader once again to re-login, thereby improving the convenience of operations of the printing apparatus.

The process to be performed in step S1010 illustrated in FIGS. 10A and 10B involves first obtaining a relevant print data list (job list) from the print managing server 400 using the user name of the second user (interruption login user) as the key in step S1101 in the flowchart illustrated in FIG. 11 (step S1101), and displaying an interrupting mode display screen of the second user illustrated in FIG. 12 (step S1102).

The processes for obtaining the print data list is the same as the processes performed in steps S613 to S616 illustrated in FIGS. 6A and 6B.

A display screen for displaying a print data list during interruption printing will now be described with reference to FIG. 12.

FIG. 12 illustrates a display screen similar to FIG. 9 and includes a display unit that displays a list of print data so as to be selectable by touch, a print instruction unit for instructing printing, and the like.

In FIG. 12, an interruption setting unit 1201 enables permission or inhibition of interruption printing of print data (whether or not interruption printing of print data of another user is to be allowed) to be set. Inhibition is the default setting.

The interrupting process is terminated when an ID hard key on the interrupting mode display screen is pressed. Otherwise, the process advances to step S1104 (step S1103).

After the ID hard key is pressed (YES in step S1103) and interruption printing is terminated, the process advances to step S1011 illustrated in FIGS. 10A and 10B described earlier to delete user information of the second user (user information 701 of interruption login 802 represented by reference numeral 806 and "user B" in user information 701 of print login 803 illustrated in FIG. 8) so as to log-out the second user.

In step S1104, desired print data is selected from the interrupting mode display screen so as to perform printing (step S1104).

Subsequently, at the interruption setting unit 1201 illustrated in FIG. 12, permission or inhibition of interruption printing with respect to the selected print data is set (step S1105; default setting is interruption inhibition).

Next, a determination is made on whether the print data of the first user is set to interruption inhibition (step S1106, discrimination of interruption permission/inhibition), and if set to interruption inhibition, the process advances to step S1107. If not, the process advances to step S1114, to be described later. Whether or not interruption inhibition has been set is determined by referencing the interruption permission/inhibition setting stored in step S618 illustrated in FIG. 6 described earlier.

At this point, when it is found that the print data for which the first user has made a print request has one or more interruption inhibition settings, it is assumed that the process advances to step S1106.

In step S1107, an approval confirming display screen 1301 illustrated in FIG. 13 is displayed. This is done because approval must be obtained from the first user if the first user has set his/her print data to interruption inhibition.

On the approval confirming display screen 1301 illustrated in FIG. 13, a display unit for displaying print data that cannot be interrupted, a message confirming whether or not an approval is to be obtained from the first user ("There is a job which cannot be interrupted. Do you want an approval?" or the like), an input unit for inputting whether or not an approval is to be obtained, and the like are to be displayed.

When an approval is to be obtained from the first user (when "yes" button is pressed in FIG. 13), the process advances to step S1109. When an approval is not to be obtained (when "no" button is pressed in FIG. 13), the interrupting process is terminated (step S1108). When the interrupting process is terminated, the process advances to step S1101 illustrated in FIGS. 10A and 10B described earlier.

In step S1109, the user name of the first user is obtained from user information 701 of print login 803 stored in the RAM 302 (step S1109). Subsequently, an approval executing display screen (re-reception notifying unit) 1401 illustrated in FIG. 14 is displayed (step S1110).

On the approval executing display screen 1401 illustrated in FIG. 14, a message prompting approval by the first user (such as "Hold User A's IC card over reader") or the like is displayed.

In order to obtain approval for interruption, the printing apparatus 300 confirms whether the IC card has been held over the reader (step S1111). When the IC card is not held over the reader for a certain period of time, the interrupting process is to be terminated. In this case also, the process advances to step S1011 illustrated in FIGS. 10A and 10B described earlier.

When the IC card is held over the reader, the process advances to step S1112. The determination of whether the IC card has been held over the reader or not is made based on whether personal authentication information (card manufacturing number) included in the IC card has been obtained or not.

In step S1112, the authentication process of steps S607 to S611 illustrated in FIG. 6 described above is executed using the personal authentication information (card manufacturing number) obtained in step S1111, and a user name is obtained (received) (step S1112).

Next, authentication is performed by determining whether or not the user name obtained in step S1112 and the user name obtained in step S1109 are the same (step S1113). If so, it is determined that the IC card of the first user under printing had been held over the reader and that authentication has been successful. The process then advances to step S1114. When authentication has failed, the process returns to step S1108 and the approval executing display screen illustrated in FIG. 14 is subsequently displayed.

Moreover, the personal authentication information (card manufacturing number) obtained in step S607 and the user name obtained in step S611 illustrated in FIGS. 6A and 6B described earlier may be arranged so as to be associated with each other and managed by the printing apparatus 300 to bypass the authentication process by the IC card authenticating server 800 performed in step S1112.

In step S1114, printing of the print data of the first user is interrupted (step S1114). Print interruption of the print data is arranged so as to take place after printing of the currently printing page is completed. The number of canceled pages is stored in interrupted pages 702 of normal login 801 illustrated in FIG. 8 as the number of interrupted pages.

Subsequently, printing of the print data of the second user (interruption login user) is executed (step S1115). Execution of printing of the print data is realized by executing the processes of steps S618 to S623 illustrated in FIGS. 6A and 6B with respect to print data selected in step S1104 using the interrupting mode display screen illustrated in FIG. 12.

In other words, print data selected (designated) in step S1104 according to FIG. 12 is obtained, printing in progress is suspended, and interruption printing of the obtained print data is performed.

Upon executing printing of the print data of the second user, the user name of the second user is stored in user information 701 of print login 803 illustrated in FIG. 8. Specifically, as represented by reference numeral 806 in FIG. 8, "user B" is stored in print login 803.

When printing of the second user is completed, the number of pages stored in the number of interrupted pages 702 of normal login 801 is obtained as the number of interrupted pages. Printing of the print data of the first user which had originally been printed is restarted based on the obtained number of pages (step S1116), and the process is completed.

According to the first embodiment, when print data of a user under printing (first user) is set to interruption inhibition, a user to perform interruption printing (second user) must obtain approval from the first user under printing in order to perform printing (step S1108). Consequently, interruption printing will no longer be performed unconditionally and convenient interruption printing can be achieved.

In addition, the second user to perform interruption printing can now log-in to an image processing apparatus as a second user who differs from the first user under printing, and select print data on which interruption printing is to be performed (step S1104). Consequently, the convenience of interruption printing can be improved.

Furthermore, the first user is to be automatically re-logged-in after interruption printing of the second user is completed (step S1014). This also contributes towards improving the convenience of interruption printing.

Second Embodiment

Next, a flow of a printing process by the print system 1 according to the present invention in a use case of three or more persons will be described.

While the first embodiment is arranged so to enable interruption by a single user as illustrated in the flowchart in FIGS. 10A and 10B, the second embodiment is arranged so to enable interruption by a plurality of users.

The difference between the second and first embodiment lies in the interruption control processes. Both embodiments share the same normal print process as illustrated in FIGS. 6A and 6B. Therefore, portions corresponding to a normal printing process will be described with reference to the flowchart illustrated in FIGS. 6A and 6B in the same manner as the first embodiment.

An interrupting process involving a plurality of users will be described using an example having two interrupting users with reference to FIGS. 15 to 17.

Figure 15:
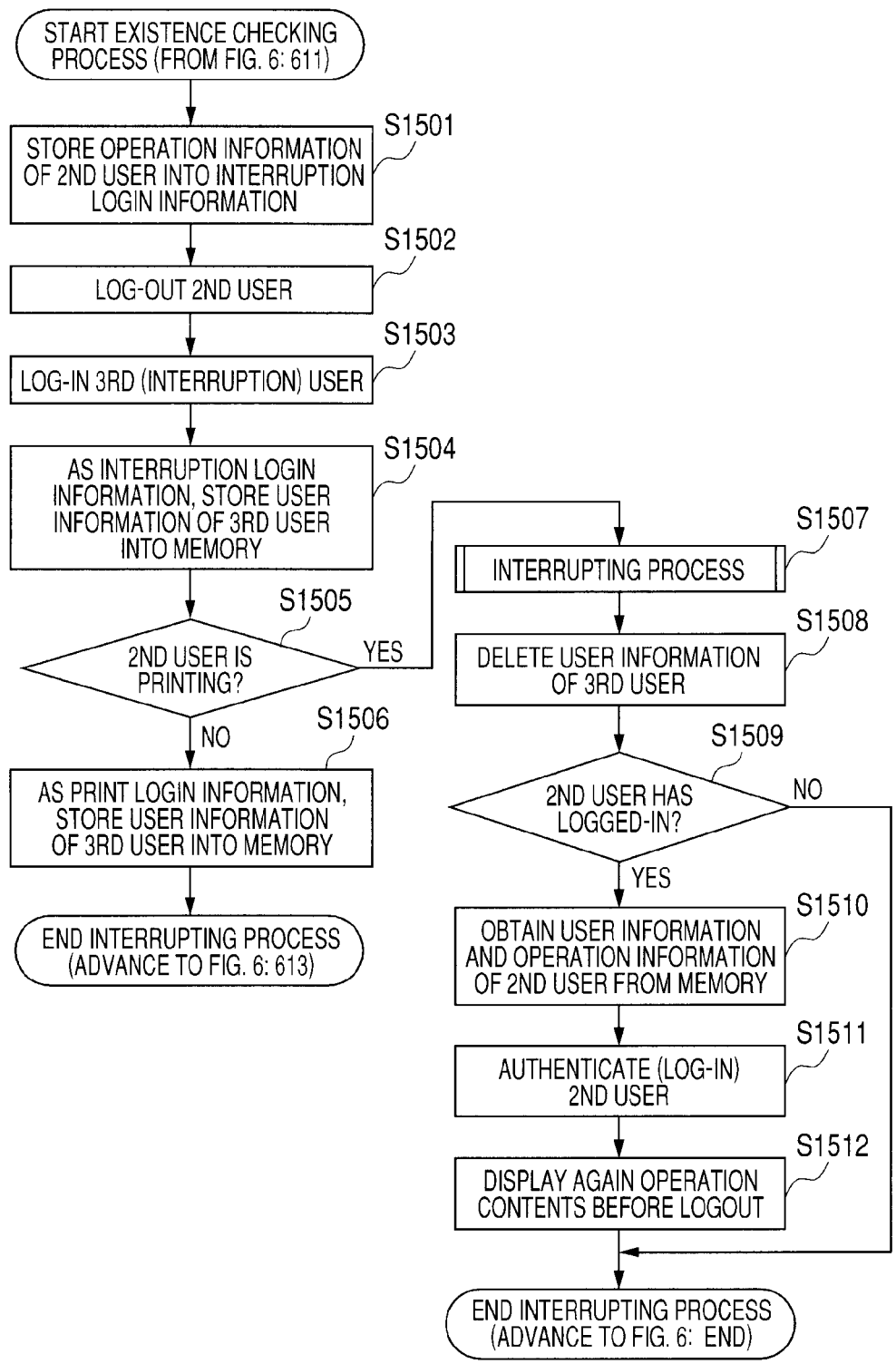
FIG. 15 is a third flowchart illustrating an example of an interruption control process procedure.

FIG. 15 is a third flowchart illustrating an example of an interruption control process procedure. FIG. 16 is a fourth flowchart illustrating an example of an interruption control process procedure. FIG. 17 is a fifth flowchart illustrating an example of an interruption control process procedure.

The present embodiment represents a process performed when two users are to interrupt. This process is performed when, from a state 813 illustrated in FIG. 8, a user of normal login 807 is user A (first user), a user of interruption login (1) 808 is user B (second user), a user of print login 810 is in the state of the user B, the user B has performed an interruption login, and user C (third user) further performs interruption printing. The following description is premised on the aforementioned state.

Before executing the processes depicted in the flowchart illustrated in FIG. 15, the third user first holds an IC card over the card reader 319. In response thereto, the printing apparatus 300 receives an authentication result (the user name of the third user) through the processes of steps S607 to S611 illustrated in FIGS. 6A and 6B and subsequently advances to the process of step S1501 illustrated in FIG. 15.

In step S1501, the printing apparatus 300 stores display screen information of the operation display screen of the second user currently displayed on the operating unit 308 into user display screen operation information 703 of interruption login (1) 808 illustrated in FIG. 8.

Subsequently, the interruption login of the second user is logged-out from the printing apparatus 300 (step S1502). Upon this logout, user information 701 of interruption login (1) 808 is not deleted.

Next, the user to perform interruption printing (third user) is logged-in to the printing apparatus 300 (step S1503), and the user name (user information) of the third user (interruption user) is stored in user information 701 of interruption login (2) 809 of the RAM 302 illustrated in FIG. 8 (step S1504). The user name is included in the aforementioned authentication result.

A state 814 illustrated in FIG. 8 is the state after the process of step S1504 has been executed.

Next, in step S1505, a determination is made on whether the second user is under printing or not. If the second user is under printing, the process advances to step S1507, and if not, the process advances to step S1506. The determination of whether printing is in progress or not is made based on whether or not the user name of the second user exists in user information 701 of print login 810 illustrated in FIG. 8.

In step S1506, the user name of the third user is stored in user information 701 of print login 810 of the RAM 302 illustrated in FIG. 8 and the process is completed. Subsequently, the process advances to step S613 illustrated in FIG. 6 described earlier and enters a flow of operations for printing.

On the other hand, in step S1507, an interrupting process is performed. Details of an interrupting process will be described later.

After the conclusion of interruption printing in step S1507, the user name (user information) of the third user stored in user information 701 of interruption login (2) 809 and in user information 701 of print login 810 illustrated in FIG. 8 is deleted (step S1508).

Alternatively, the entire data 70 corresponding to interruption login (2) 809 may be arranged to be deleted.

In addition, the user name of the third user is deleted and the third user is logged-out.

Subsequently, in step S1509, if the second user is in an interruption login state, the process advances to step S1510. Otherwise, the process is terminated. The determination of whether or not the second user is in an interruption login state is made based on whether or not the user name exists in user information 701 of interruption login (1) 808 illustrated in FIG. 8.

Next, in step S1510, display screen information stored in step S1501 is obtained from user display screen operation information 703 and a user name is obtained from user information 701 of interruption login (1) 808 stored in the RAM 302 (step S1510).

A re-login process of the second user is then performed using the user name obtained in step S1510 (step S1511).

Subsequently, a display screen corresponding to the display screen information obtained in step S1510 is displayed on the operating unit 308 and restored to the display state prior to the logout of the second user (step S1512), and the process is completed. After the process is completed, a flow is entered where the first user restarts operations of the printing apparatus 300 based on re-displayed display screen information and performs printing.

The processes of steps S1511 and S1512 are the same as the processes of steps S1014 and S1015 illustrated in FIG. 11 described earlier.

By performing the processes of steps S1510 to S1512, the second user is no longer required to hold his/her IC card over the reader once again to re-login, thereby improving the convenience of operations of the printing apparatus.

Figure 16:
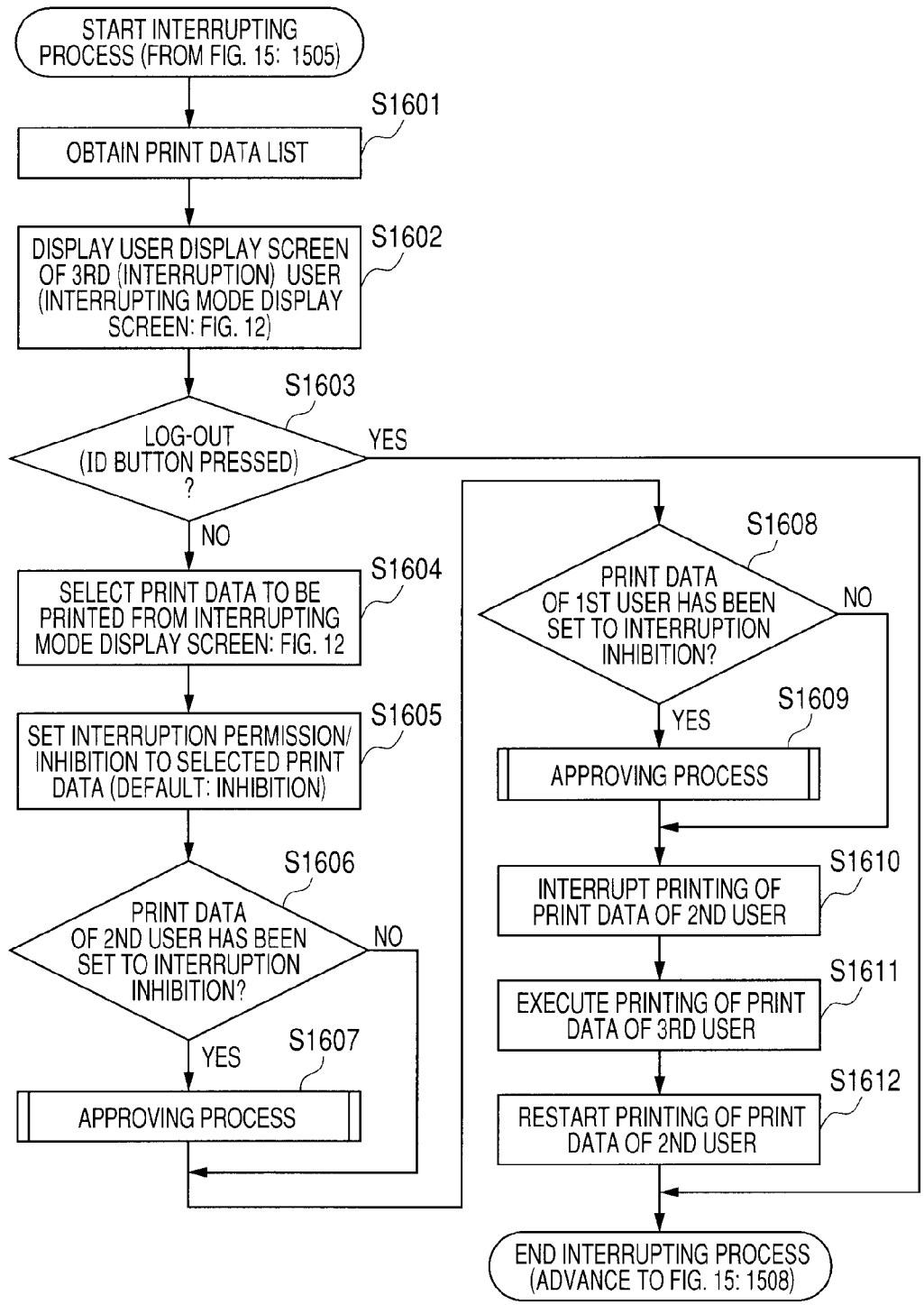
FIG. 16 is a fourth flowchart illustrating an example of an interruption control process procedure.
Figure 17:
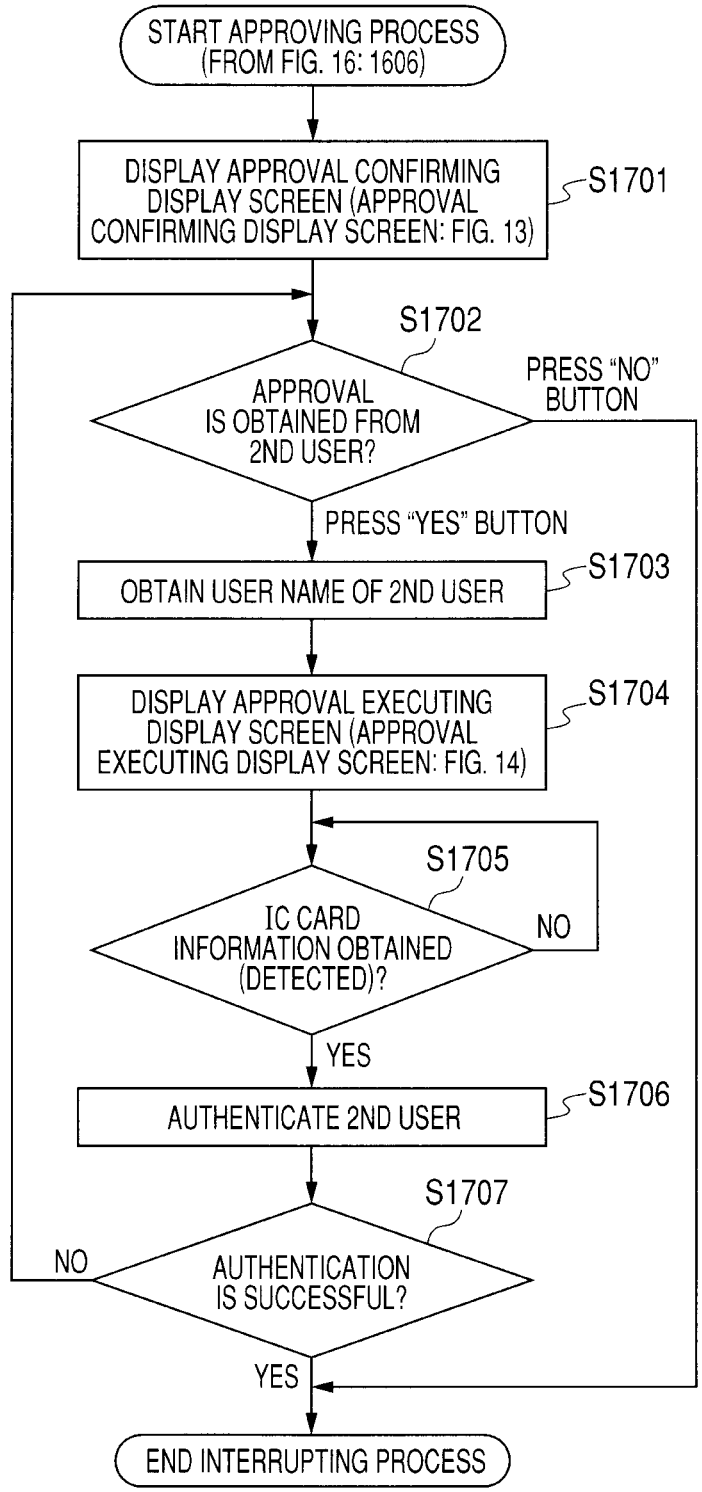
FIG. 17 is a fifth flowchart illustrating an example of an interruption control process procedure.

FIG. 16 and FIG. 17 are flowcharts illustrating an interruption printing process.

Since FIG. 11 represents a case where there is one interruption user, authentication of a normal login user (first user) is to be obtained. However, since FIG. 16 represents a case where there are two interruption users, authentication is to be obtained for both a normal login user (first user) and an interruption login (1) user (second user).

In the process to be performed in step S1507 illustrated in FIG. 15, first, in step S1601 in the flowchart illustrated in FIG. 16, a relevant print data list (job list) is obtained from the print managing server 400 using the user name of the third user (interruption login (2) user) as a key (step S1601). Step S1601 corresponds to the process of step S1101 illustrated in FIG. 11 and replaces the second user with the third user.

Subsequently, the interrupting mode display screen illustrated in FIG. 12 is displayed (step S1602). Step S1602 corresponds to the process of step S1102 illustrated in FIG. 11.

The interrupting process is terminated when an ID hard key on the interrupting mode display screen is pressed. Otherwise, the process advances to step S1604 (step S1603). Step S1603 corresponds to the process of step S1103 illustrated in FIG. 11.

Moreover, after the ID hard key is pressed (YES in step S1603) and interruption printing is terminated, the process advances to step S1508 illustrated in FIG. 15 and described earlier to delete user information of the third user (user information 701 of interruption login (2) 809 represented by reference numeral 815 and "user C" in user information 701 of print login 810 illustrated in FIG. 8) so as to log-out the third user.

In step S1604, desired print data is selected from the interrupting mode display screen so as to perform printing (step S1604). Step S1604 corresponds to the process of step S1104 illustrated in FIG. 11 and replaces the second user with the third user.

Subsequently, at the interruption setting unit 1201 illustrated in FIG. 12, permission or inhibition of interruption printing with respect to the selected print data is set (step S1605; default setting is interruption inhibition). Step S1605 corresponds to the process of step S1105 illustrated in FIG. 11.

Next, a determination is made on whether or not the print data of the second user is set to interruption inhibition (step S1606), and if set to interruption inhibition, the process advances to step S1607. If not, the process advances to step S1608, to be described later. Step S1606 corresponds to the process of step S1106 illustrated in FIG. 11 and replaces the first user with the second user.

At this point, when it is found that the print data for which the second user has made a print request has one or more interruption inhibition settings, it is assumed that the process advances to step S1607.

In step S1607, an approving process of the second user is performed. Details of the approving process will be described later.

After conclusion of the approving process in step S1607, the process advances to step S1608.

In step S1608, a determination is made on whether the print data of the first user is set to interruption inhibition (step S1608), and if set to interruption inhibition, the process advances to step S1609. If not, the process advances to step S1610, to be described later. Step S1608 corresponds to the process of step S1106 illustrated in FIG. 11.

In step S1609, an approving process of the first user is performed. Details of the approving process will be described later.

After conclusion of the approving process in step S1609, the process advances to step S1610.

In step S1610, printing of the print data of the second user is interrupted (step S1610). Step S1610 corresponds to the process of step S1114 illustrated in FIG. 11 and replaces the first user with the second user.

Print interruption of the print data is arranged so as to take place after printing of the currently printing page is completed. The number of interrupted pages is stored in interrupted pages 702 of interruption login (1) 808 illustrated in FIG. 8 as the number of interrupted pages.

Subsequently, printing of the print data of the third user (interruption login (2) user) is executed (step S1611). Printing of the print data is realized by executing the processes of steps S618 to S623 illustrated in FIGS. 6A and 6B with respect to the print data selected in FIG. 12. Upon executing printing of the print data of the third user, the user name of the third user is stored in user information 701 of print login 810 illustrated in FIG. 8. Specifically, as represented by reference numeral 815 in FIG. 8, "user C" is stored in print login 810. Step S1611 corresponds to the process of step S1115 illustrated in FIG. 11 and replaces the second user with the third user.

When printing of the third user is completed, the number of pages stored in the number of interrupted pages 702 of interruption login (1) 808 illustrated in FIG. 8 is obtained as the number of interrupted pages. Printing of the print data of the second user which had originally been printed is restarted based on the obtained number of pages (step S1612), and the process is completed. Step S1612 corresponds to the process of step S1116 illustrated in FIG. 11 and replaces the first user with the second user.

Moreover, when printing of the second user is completed, printing of the first user is started.

An approving process by the second user to be performed in step S1607 illustrated in FIG. 16 will now be described with reference to FIG. 17.

In the process to be performed in step S1607 illustrated in FIG. 16, first, the approval confirming display screen 1301 illustrated in FIG. 13 is displayed in step S1701 in the flowchart illustrated in FIG. 17. The approval confirming display screen 1301 is displayed because approval must be obtained from the second user if the second user has set his/her print data to interruption inhibition. Step S1701 corresponds to the process of step S1107 illustrated in FIG. 11 and replaces the first user with the second user.

When an approval is to be obtained from the second user (when "yes" button is pressed in FIG. 13), the process advances to step S1703. When an approval is not to be obtained (when "no" button is pressed in FIG. 13), the interrupting process is terminated (step S1702). When the interrupting process is terminated, the process advances to step S1508 illustrated in FIG. 15 described earlier. Step S1702 corresponds to the process of step S1108 illustrated in FIG. 11 and replaces the first user with the second user.

In step S1703, the user name of the second user is obtained from user information 701 of print login 810 stored in the RAM 302 (step S1703). Subsequently, an approval executing display screen 1401 illustrated in FIG. 14 is displayed (step S1704). Steps S1703 and S1704 correspond to the processes of steps S1109 and S1110 illustrated in FIG. 11 and replaces the first user with the second user.

In order to obtain approval for interruption, the printing apparatus 300 confirms whether the IC card has been held over the reader (step S1705). When the IC card has not been held over the reader for a certain period of time, the interrupting process is to be terminated. In this case also, the process advances to step S1508 illustrated in FIG. 15 described earlier.

When the IC card has been held over the reader, the process advances to step S1706. The determination of whether the IC card has been held over the reader or not is made based on whether personal authentication information (card manufacturing number) included in the IC card has been obtained or not. Step S1705 corresponds to the process of step S1111 illustrated in FIG. 11.

In step S1706, the authentication process of steps S607 to S611 illustrated in FIGS. 6A and 6B described above is executed using the personal authentication information (card manufacturing number) obtained in step S1705, and a user name is obtained (received) (step S1706). Step S1706 corresponds to the process of step S1112 illustrated in FIG. 11.

Next, authentication is performed by determining whether or not the user name obtained in step S1706 and the user name obtained in step S1703 are the same (step S1707). If so, it is determined that the IC card of the second user under printing had been held over the reader and that authentication has been successful, and the approving process is completed. After conclusion of the approving process, the process jumps to step S1608 illustrated in FIG. 16 described earlier. On the other hand, when authentication has failed, the process returns to step S1702 and the approval executing display screen illustrated in FIG. 14 is subsequently displayed. Step S1707 corresponds to the process of step S1113 illustrated in FIG. 11 and replaces the first user with the second user.

Moreover, the approving process performed in step S1609 illustrated in FIG. 16 is similar to the processes performed in steps S1107 to S1113 illustrated in FIG. 11 and a description thereof will be omitted.

In the present embodiment also, convenient interruption printing can be performed in the same way as the first embodiment. Specifically, the present embodiment enables user approval when performing interruption printing, selection of print data on which interruption printing is to be performed, automatic re-login after conclusion of interruption printing of a user who had been printing before the interruption printing, and the like. Consequently, the convenience of interruption printing can be improved.

Even in a use case involving three or more persons, an interruption control process can be considered in a similar manner to the second embodiment. Specifically, a person desiring to newly perform interruption printing can do so by obtaining, as necessary, approvals of users logged-in to the printing apparatus 300 including a user under printing (print login user). After conclusion of interruption printing, re-login of the user who had originally been printing is automatically performed and printing is restarted. In this case, a user to newly perform interruption printing can perform an interruption login in advance to select print data on which interruption printing is to be performed.

In the first and second embodiments, interruption printing is arranged so as to interrupt printing in the middle of a single unit of print data (a single job). Alternatively, interruption printing can be arranged so as to complete printing of a single unit of print data (a single job) and interrupt printing of print data to be subsequently printed.

Third Embodiment

For the third embodiment, an interruption printing method will be described which, when a user to perform interruption printing (second user) interrupts printing of a user under printing (first user), enables such interruption printing to be executed without having to obtain approval of the first user if a confirmation of print authority information set in advance to both users reveals that the print authority of the second user is higher than the print authority of the first user.

The third embodiment will be described using a standard printer (single-functional printer) as an example of the printing apparatus (image processing apparatus). In the print system 1 illustrated in FIG. 1 which will now be explained, however, the one or more printing apparatuses (image processing apparatuses) 300 (which are installed on every floor of an office building, for example) may comprise a low-end MFP incapable of performing a rich display on the operating display screen on its main body panel.

Figure 18B:
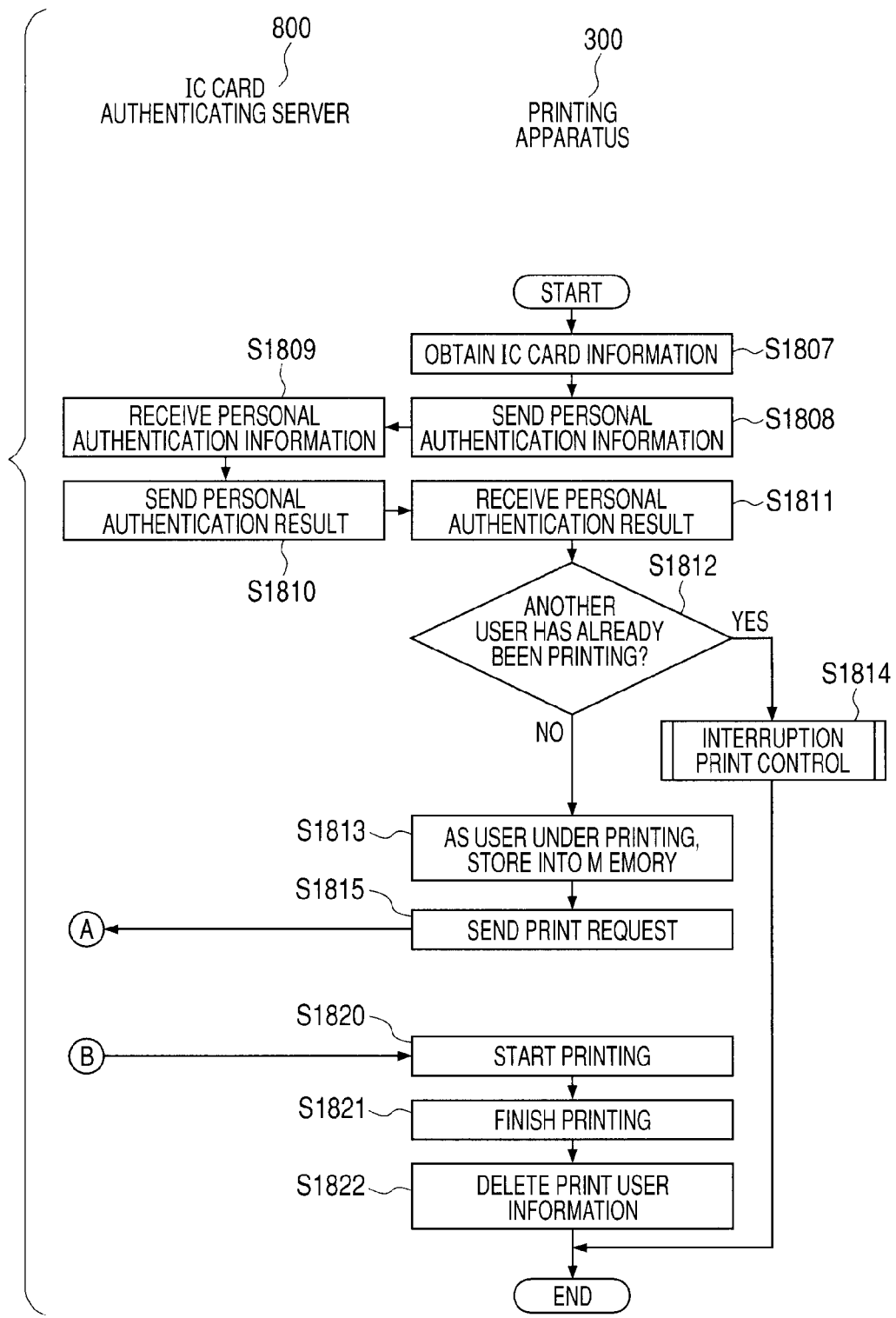
FIG. 18 is comprised of FIGS. 18A and 18B showing flowcharts illustrating an overall flow of a second interruption print mode of the print system 1.

In the flowchart illustrated in FIGS. 18A and 18B, a user logs-in to the client PC 100, and from an application program executed on the client PC 100, issues a print instruction to a logical printer corresponding to a printer driver set as the print destination.

Since the processes of steps S1801 to S1806 illustrated in FIGS. 18A and 18B are the same as the processes of steps S601 to S606 illustrated in FIGS. 6A and 6B, a description thereof will be omitted.

Upon detecting an IC card readable by the card reader 319, the printing apparatus 300 reads personal authentication information in the IC card (step S1807), and sends the read personal authentication information as an authentication request to the IC card authenticating server 800 (step S1808). Personal authentication information is information to be used for authentication and may be a manufacturing number of the IC card.

Upon receiving personal authentication information from the printing apparatus 300 (step S1809), the IC card authenticating server 800 performs authentication of the personal authentication information based on the table for IC card authentication 50 illustrated in FIG. 5 stored on an external storage device of the IC card authenticating server 800, and sends an authentication result to the printing apparatus 300 (step S1810). When authentication is successful, a user name (user identification information) 502 that is the login name of the client PC 100 and a print authority (print authority information) 507 are to be sent as an authentication result.

With respect to the table for IC card authentication, the table 50 illustrated in FIG. 5 is applied to this embodiment.

The printing apparatus 300 receives the user name 502, a print authority 507 and the like as an authentication result signifying a successful authentication from the IC card authenticating server 800 (step S1811).

Next, the printing apparatus 300 references the user information of a user under printing 2101 of a user management table 2100 (FIG. 21) retained in the RAM 302 (identification information storage unit) to discriminate whether or not a user under printing exists (step S1812).

As illustrated in FIG. 21, the user management table 2100 includes a user under printing 2101 representing information regarding a user under printing (first user) using the printing apparatus 300 and an interruption user 2102 representing information regarding a user performing interruption printing (second user).

When a user under printing already exists, the process advances to step S1814. If not, the process advances to step S1813.

If a user under printing exists, interruption printing control is performed and then the processing is terminated (step S1814). Details of the interruption printing process will be described later using the flowchart illustrated in FIG. 19.

When a user under printing does not exist, the printing apparatus 300 stores the user currently logged in as the user under printing 2101 in the user management table 2100 retained in the RAM 302 (step S1813).

Next, the printing apparatus 300 sends a print request (print instruction) for all print data of the user related to the personal authentication result obtained in step S1811 to the print managing server 400 (step S1815). The print request is to include a user name and the like.

Upon receiving a print request for print data from the printing apparatus 300 (step S1816), the print managing server 400 searches bibliographical information 40 of the print data for which the output instruction had been issued from the bibliographical information DB using the user name as a key, identifies the print server 200 storing corresponding print data from the searched bibliographical information, and sends a print request for the corresponding print data to the print server 200 (step S1817).

The print request is a print command including a corresponding time stamp, document name, and printer IP address. The IP address may either be included in the print request or notified separately. The time stamp is to be attached upon reception of the print data by the print server 200.

Upon receiving a print request from the print managing server 400 (step S1818), the print server 200 sends print data to the printing apparatus 300 based on the print request (step S1819). The printing apparatus 300 receives the print data and prints the print data using LPR printing (step S1820).

Once printing by the printing apparatus 300 is completed (step S1821), the printing apparatus 300 deletes information of the user under printing 2101 in the user management table 2100 stored in step S1813 (step S1822).

Hereinafter, interruption control performed in the print system 1 according to the present embodiment will be described with reference to FIG. 19.

Figure 19:
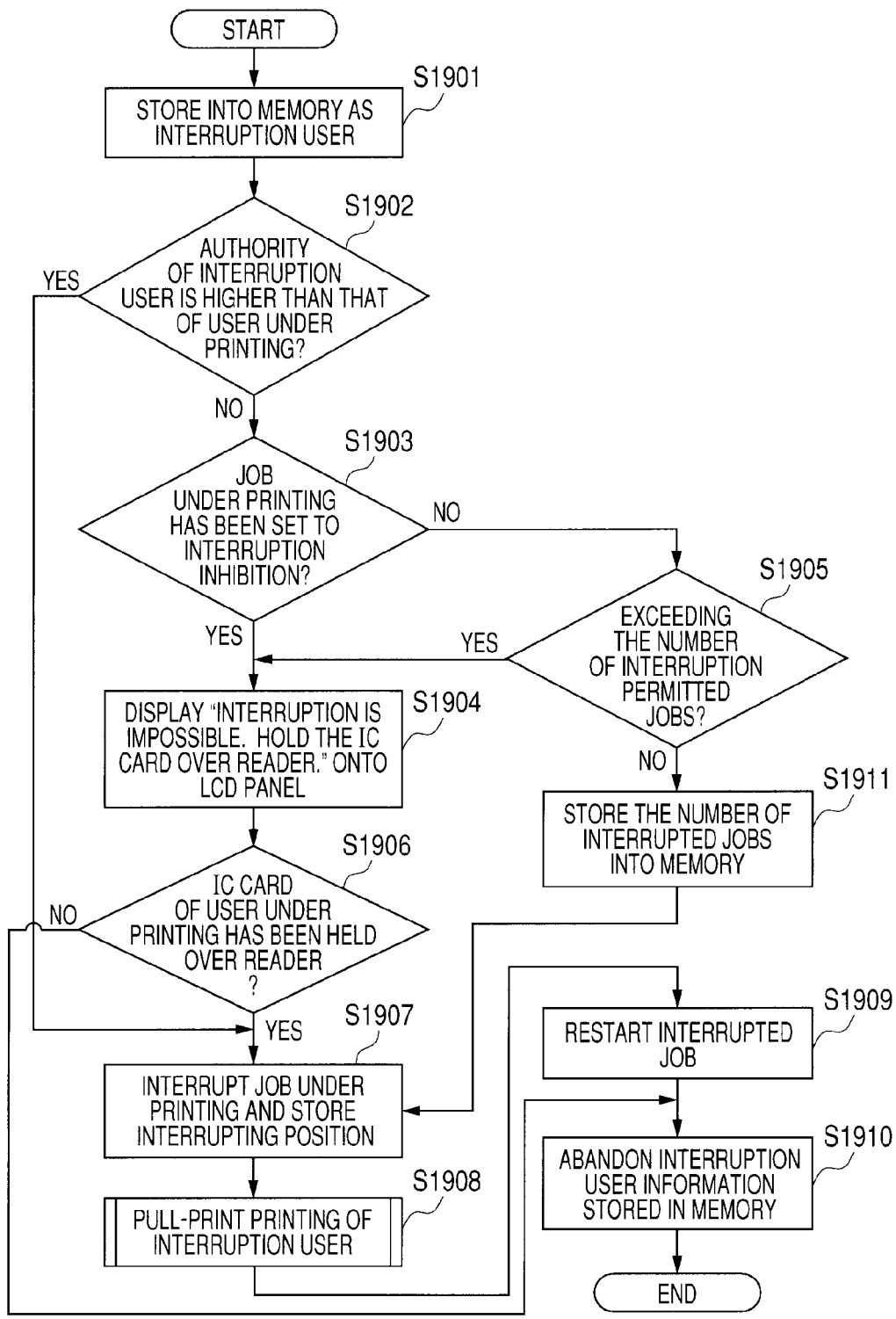
FIG. 19 is a first flowchart illustrating an example of a process procedure of the second interruption print mode.

The interruption control process illustrated in FIG. 19 represents details of the interruption print control performed in step S1814 in FIG. 18B, and is realized by having the CPU 301 of the printing apparatus 300 load a program stored in the ROM 303 or the HDD 304 onto the RAM 302 and execute the program.

When the second user attempts to perform interruption printing when the first user is under printing using the printing apparatus 300, the CPU 301 of the printing apparatus 300 stores the second user as an interruption user in the interruption user 2102 of the user management table 2100 retained in the RAM 302 (step S1901).

Subsequently, the CPU 301 of the printing apparatus 300 compares the print authority 507 of the user under printing 2101 that is the first user with the print authority 507 of the interruption user 2102 that is the second user (step S1902).

As for the method of comparing authorities, numerical levels of the print authority 507 arbitrarily distributed to the IC cards of the respective users may be compared or the levels of categories such as administrative positions and general office employees may be compared. If the print authority of the second user is higher than the print authority of the first user, a forced transition to an interruption mode occurs and the process advances to step S1907. If the print authority of the second user is equal to or lower than the print authority of the first user, the process advances to step S1903.

In step S1903, the printing apparatus 300 references bibliographical information 40 of the job under printing and discriminates whether or not permission or inhibition of interruption printing 409 is set to "interruption inhibition" (step S1903). When "interruption inhibition" is set, a character string clearly indicating that interruption is inhibited such as "Interruption is impossible. Hold the IC card over reader." is displayed on the operating unit 308 (step S1904). When double-byte characters such as kanji can be displayed on the operating unit 308, a message such as "Mr./Ms. XXX, please hold your IC card over reader" may be displayed instead. Meanwhile, when permission or inhibition of interruption printing 409 is set to "interruption permission", the process advances to step S1905.

The discrimination of step S1903 may alternatively involve the printing apparatus 300 sending a discrimination request including a job name of the job under printing and the like to the print managing server 400 and having the print managing server 400 discriminate permission or inhibition of interruption printing using the job name and the like, and the printing apparatus 300 receiving a discrimination result.

In step S1905, the CPU 301 of the printing apparatus 300 references the bibliographical information 40 of the job under printing, obtains the number of interruption permitted jobs 410, and compares the number of interruption permitted jobs 410 with the number of jobs interrupted by the second user which is saved in the RAM 302 (step S1905). In the present example, the default value of the number of interruption permitted jobs is set to "1". When the number of interrupted jobs exceeds the number of interruption permitted jobs 410, the process advances to step S1904 described earlier.

On the other hand, when the number of interrupted jobs is equal to or lower than the number of interruption permitted jobs 410, the CPU 301 of the printing apparatus 300 stores the number of interrupted jobs into the RAM 302, the process advances to step S1907, and a transition to interruption printing is made (step S1911).

The discrimination of step S1903 may alternatively involve the printing apparatus 300 sending a discrimination request including a job name of the job under printing, a user name of the second user, and the like to the print managing server 400 and having the print managing server 400 discriminate permission or inhibition of interruption printing using the job name, the user name and the like, and the printing apparatus 300 receiving a discrimination result.

After displaying a character string clearly indicating that interruption is inhibited on the operating unit 308 in step S1904, in order to obtain an approval for interruption, the printing apparatus 300 confirms whether or not the IC card of the first user under printing has been held over the reader and an approval instruction has been received from the first user (step S1906). When the IC card is not held over the reader for a certain period of time and an approval instruction of the first user has not been received, the process advances to step S1910 and interruption printing is completed.

When the IC card of the first user has been held over the reader, the process advances to step S1907.

In order to make a transition to interruption printing, the printing apparatus 300 interrupts the job under printing of the first user and stores the interrupting position in the RAM 302 (step S1907). While the number of the page under printing is to be stored in this case, when a plurality of jobs is under printing, printing may be interrupted between jobs.

Specifically, the present application includes an interruption printing permission/inhibition discriminating process in which user identification information of a second user is received while printing of print data of a first user is being performed and a discrimination is made on whether or not interruption printing of print data of the second user managed in association with the user identification information of the second user can be performed. The interruption printing permission/inhibition discriminating process includes the "print authority" determination in step S1902, the "interruption printing permission" determination in step S1903, and "the number of interruption printing permitted jobs" in step S1905. In addition, as described herein with respect to step S1907, it is assumed that the interruption printing permission/inhibition discriminating process also includes: a determination on whether interruption printing can be performed or not made by determining whether or not printing is in-between pages of a single print job; and a determination on whether interruption printing can be performed or not made by determining whether or not printing is in-between print jobs at which, after the conclusion of a print job under printing, a print job of the same user is standing-by.

Furthermore, it is assumed that a determination on "the number of interruption permitted users" is also included in the present interruption printing permission/inhibition discriminating process. For example, the present interruption printing permission/inhibition discriminating process may involve not approving printing by a third user when an IC card of the third user is newly held over the reader when the second user is already performing interruption printing (interruption of interruption), or may involve determining whether or not interruption printing is to be enabled upon obtaining approvals from the first and second users.

Moreover, it is assumed that the present interruption printing permission/inhibition discriminating process also includes making a discrimination based on any one or a combination of the plurality of determinations listed above.

The printing apparatus 300 performs interruption printing of the second user (step S1908). Details of an interruption printing process will be described later. Upon conclusion of interruption printing, the printing apparatus 300 restarts printing of the job that has been interrupted (step S1909). In doing so, printing is restarted from the interrupting position stored in step S1907. After conclusion of printing, the CPU 301 of the printing apparatus 300 discards information on the user stored in step S1901 in interruption user 2102 of the user management table 2100 in the RAM 302 from the memory and terminates the process (step S1910).

Next, an interruption printing process by the second user performed in step S1908 will be described in detail with reference to FIG. 20.

First, using a user name of the second user read from the IC card as a key, the printing apparatus 300 obtains a job list that is a list of print data of the second user from the print managing server 400 (step S2001), and saves the job name at the top of the job list in the RAM 302 (step S2002).

Next, the printing apparatus 300 displays a character string such as "Select job" which prompts the second user to select a job on the operating unit 308 (step S2003).

The printing apparatus 300 then obtains the number of times the up/down key had been pressed by the second user (step S2004). A timeout discrimination is made on whether or not the up/down key has been pressed. If the up/down key has not been pressed for a certain period of time, the process proceeds to step S2008.

Subsequently, the printing apparatus 300 searches for a job name corresponding to the number of times obtained in step S2004 from the job list (step S2005), saves a matching job name in the RAM 302 (step S2006), and displays the job name saved in the RAM 302 on the operating unit 308 (step S2007).

Next, the printing apparatus 300 checks whether the IC card of the second user has been held over the reader to start interruption printing (whether a print instruction has been received) (step S2008). When the IC card of the second user has not been held over the reader for a certain period of time, interruption printing is aborted and the interruption printing process is terminated as-is. When the IC card has been held over the reader, the process advances to step S2009.

Whether or not the IC card of the second user is checked by performing the processes of steps S1807 to S1811 illustrated in FIG. 18B and determining whether the obtained (received) user name is consistent with the interruption user 2102 illustrated in FIG. 21.

In step S2009, the printing apparatus 300 obtains a print job corresponding to the job name saved in the RAM 302 in step S2006 from the print managing server 400 (step S2009), and prints the obtained job (step S2010).

The printing apparatus 300 confirms whether or not interruption printing by the second user has been completed (step S2011), and upon conclusion of interruption printing, completes the interruption printing process.

As described above, the third embodiment is capable or realizing an interruption printing method which, when a user to perform interruption printing (second user) interrupts printing of a user under printing (first user), enables such interruption printing to be executed without having to obtain approval of the first user if a confirmation of print authority information set in advance to both users reveals that the print authority of the second user is higher than the print authority of the first user.

In addition, the third embodiment is capable of providing an image processing apparatus, a network interface apparatus, a control method, and a program capable of efficiently executing interruption printing. In particular, since permission or inhibition of interruption printing and the number of interruption jobs can now be controlled such as limiting interruption jobs to one job, the printing wait time of an interrupted user can be advantageously reduced.

Fourth Embodiment

Hereinafter, a fourth embodiment of the present invention will be described in detail.

For the fourth embodiment, an arrangement will be described in which the printing apparatus 300 is equipped with functions for performing both: the interruption printing method described earlier in the first embodiment which requires that a user (second user) to perform interruption printing obtain approval from a user under printing (first user) when print data of the first user under printing is set to interruption inhibition; and the interruption printing method described earlier in the third embodiment which, when a user to perform interruption printing (second user) interrupts printing of a user under printing (first user), enables such interruption printing to be executed without having to obtain approval of the first user if a confirmation of print authority information set in advance to both users reveals that the print authority of the second user is higher than the print authority of the first user, and either of the functions can be used depending on the setting. In addition, an arrangement will be described in which, depending on the setting of an administrative user of the printing apparatus 300, the two functions can be switched back and forth as appropriate.

FIG. 22 is a flowchart illustrating processes of the fourth embodiment according to the present invention.

Since the same processes as steps S607 to S611 illustrated in FIG. 6B are to be performed in steps S2201 to S2205, a description thereof will be omitted.

In step S2206, the printing apparatus 300 discriminates whether interruption is to be performed using print authority (interruption print mode). When it is set that interruption printing be performed while a print authority discriminating mode in an IC card is enabled, the process advances to step S2207. When it is set that interruption printing be performed while the print authority discriminating mode is deactivated, the process advances to step S2208.

Figure 23:
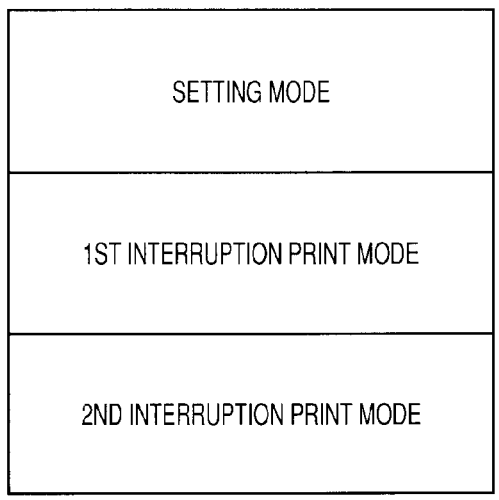
FIG. 23 illustrates a setting file of interruption print modes stored in the printing apparatus 300.

It is assumed that the printing apparatus 300 stores, in advance, a setting file such as that illustrated in FIG. 23 in order to perform print authority mode discrimination in step S2206.

FIG. 23 illustrates a setting file stored in advance in the external memory 211 of the printing apparatus 300 to be used to switch among functions of the printing apparatus 300.

A user (in this case, for example, an administrative user) changes (switches) function settings of the printing apparatus 300 via a UI illustrated in FIG. 23.

The setting file illustrated in FIG. 23 has a setting for approving interruption printing without using the print authority of a user at the time of interruption printing but by always obtaining an approval from a user under printing (first interruption print mode) and a setting in which whether or not interruption printing is to be permitted is determined by having the printing apparatus 300 discriminate the print authority of a user (second interruption print mode). The user is to select, in advance, an interruption print method via the UI illustrated in FIG. 24.

Figure 24:
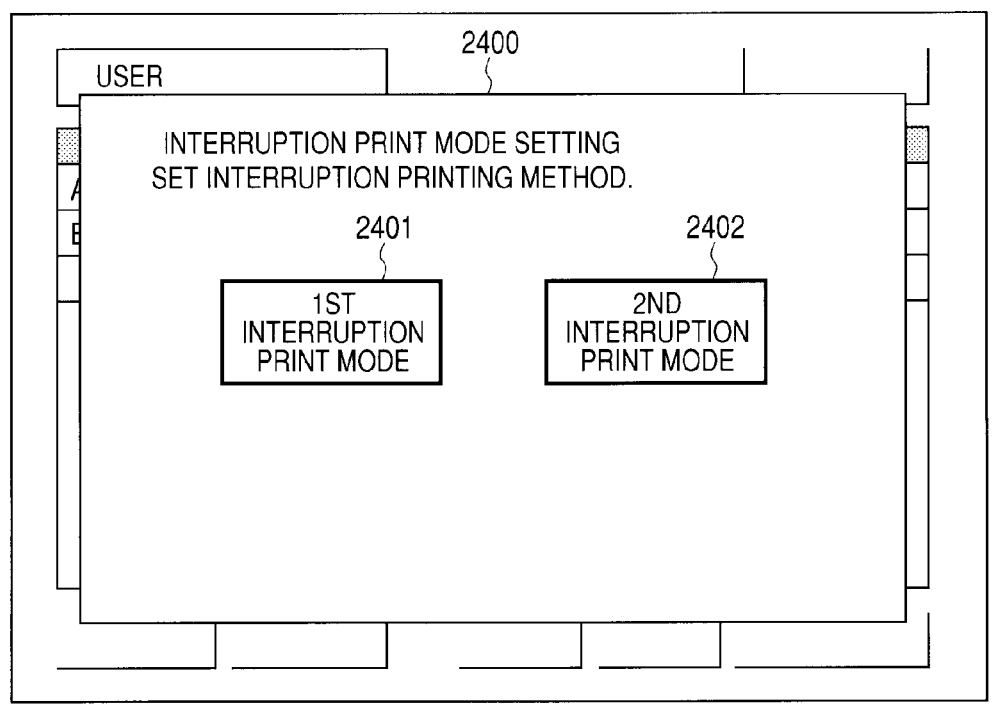
FIG. 24 is a fifth diagram illustrating an example of a user display screen.

The UI illustrated in FIG. 24 is for having a user discriminate interruption print modes. For example, by displaying mode switch buttons such as mode switch buttons 2401 and 2402, the user is prompted to select an interruption print mode.

In step S2207, the processes of steps S1812 to S1822 illustrated in FIG. 18B as well as processes illustrated in FIGS. 19 and 20 (example of third embodiment) are to be performed. While a selection method of a job to be printed has been described for the third embodiment on the assumption that the printing apparatus 300 is a printer not equipped with a rich UI or the like (single-functional printer), the fourth embodiment may be applied to an operation in which the type of usable printers is not necessarily limited to such a single-functional printer. In such a case, as for a selection method of a job to be printed, a UI that causes a job of an interruption user B to be selected such as that illustrated in FIG. 12 may be displayed, whereby a job selection by the user B is to be received.

In the process of step S2207, since print authority discrimination has been activated, if the authority of an interruption user is higher than the authority of a priorly printing user, the prior printing is suspended to perform interruption printing. In addition, when the authority of the priorly printing user is higher, control is performed such that interruption printing is to be approved by holding the IC card of the priorly printing user over the reader.

In step S2208, the processes of steps S612 to S624 illustrated in FIG. 6 as well as processes illustrated in FIGS. 10A, 10B, 11, 15, 16, and 17 are to be performed. In the process of step S2208, since print authority discrimination is disabled, control is performed such that an interruption user obtains approval for interruption printing by holding the IC card of a priorly printing user over the reader.

With the fourth embodiment according to the present invention, switching of controls of the printing apparatus 300 can now be performed with respect to whether or not interruption printing is to be performed using print authority information set in advance in a table for IC card authentication.

As described above, with the fourth embodiment, an interruption print method can be provided in which the printing apparatus 300 is equipped with functions for performing both: the interruption printing method described earlier in the first embodiment which requires that a user to perform interruption printing (second user) obtain approval from a user under printing (first user) when print data of the first user under printing is set to interruption inhibition; and the interruption printing method described earlier in the third embodiment which, when a user to perform interruption printing (second user) interrupts printing of a user under printing (first user), enables such interruption printing to be executed without having to obtain approval of the first user if a confirmation of print authority information set in advance to both users reveals that the print authority of the second user is higher than the print authority of the first user, and either of the functions can be used depending on the setting.

In addition, by performing switching control with the printing apparatus 300 in regards to which of the two embodiments and methods described above is to be used, a print method that is more convenient to a user can be realized.

While four examples of embodiments have been described in detail above, the present invention may take such forms as a system, an apparatus, a method, a program, or a storage medium. Specifically, the present invention may be applied to a system made up of a plurality of devices or to an apparatus made up of a single device.

According to the present embodiment, interruption printing can be performed by card authentication while preventing a situation in which interruption printing is started solely based on a determination by an interrupting person without an approval of a printing person and the printing of the printing person is involuntarily interrupted. In particular, with a "pull-print (store-and-print)" print system, since jobs accumulated in a management server can be displayed as a list and a user can select and print a desired job, a situation can be avoided in which the printing of a plurality of jobs by an interrupting person causes an interrupted printing person to wait for an extended period of time without approval.

When user identification information of a second user who differs from a first user under printing and interruption printing of the print data of the second user is received, convenient interruption printing can be performed by once again receiving identification information of the first user under printing.

In addition, by respectively attaching print authorities to the users and discriminating which print authority is higher when the second user performs interruption printing when the first user is under printing, the user with the higher print authority can perform interruption printing without having to obtain the approval of the user under printing. Furthermore, switching can be performed by a printing apparatus to determine which of the two interruption print methods described above is to be applied.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-325807, filed Dec. 22, 2008, and No. 2008-325822, filed Dec. 22, 2008, which are hereby incorporated by reference herein in their entirety.

What is claimed is:

1. An image processing apparatus capable of communicating with a print managing server that manages print data in association with user identification information, the image processing apparatus comprising:
a memory configured to store user identification information of a first user in response to receiving the user identification information of the first user;
communication interface configured to:
send a print instruction including the user identification information of the first user stored in the memory to the print managing server, and
receive print data of the first user managed in association with the user identification information of the first user included in the print instruction;
a printer configured to print the print data of the first user received by the communication interface; and
a processor coupled to the memory and programmed to function as:
a permission/inhibition discriminating unit configured to receive user identification information of a second user while printing of the print data of the first user is being performed by the printer and discriminate whether or not interruption printing of print data of the second user managed in association with the user identification information of the second user can be performed,
a determining unit configured to determine whether or not the permission/inhibition discriminating unit is to be enabled,
an interruption unit configured to perform the interruption printing of the print data of the second user when the determining unit determines that the permission/inhibition discriminating unit is to be enabled and the permission/inhibition discriminating unit discriminates that the interruption printing of the print data of the second user can be performed, and
a restarting unit configured to restart printing of the print data of the first user interrupted by the interruption unit after the interruption printing of the print data of the second user is finished,
wherein the interruption unit is configured to perform, when the determining unit determines that the permission/inhibition discriminating unit is not to be enabled and if the print data of the first user is undergoing printing, the interruption printing of the print data of the second user in response to a re-reception of the user identification information of the first user regardless of a discrimination result by the permission/inhibition discriminating unit.

2. The image processing apparatus according to claim 1, wherein, when the permission/inhibition discriminating unit discriminates that the print data of the first user is not undergoing printing, the communication interface sends a print instruction including the user identification information of the second user to the print managing server and receives the print data of the second user managed in association with the user identification information of the second user included in the print instruction sent, and wherein the printer prints the print data of the second user received by the communication interface.

3. The image processing apparatus according to claim 1, wherein the processor is further programmed to function as an approval receiving unit configured to determine, when the permission/inhibition discriminating unit discriminates that the interruption printing of the print data of the second user cannot be performed, that the interruption unit is capable of performing the interruption printing of the print data of the second user by receiving an approval instruction of the first user.

4. The image processing apparatus according to claim 1, wherein the permission/inhibition discriminating unit discriminates whether or not the interruption printing of the print data of the second user managed in association with the user identification information of the second user can be performed based on print authority information, interruption permission/inhibition information, information on a number of interruption-permitted jobs, and information on a number of interruption-permitted persons.

5. The image processing apparatus according to claim 1, wherein the processor is further programmed such that the interruption unit:
    obtains a list of print data of the second user managed in association with the user identification information of the second user, and
    receives a print instruction for desired print data among the list of print data of the second user obtained by the obtaining unit.

6. The image processing apparatus according to claim 5, wherein the print instruction for the desired print data is received in response to the user identification information of the second user being received by the permission/inhibition discriminating unit.

7. The image processing apparatus according to claim 1, wherein the interruption unit causes the memory to store a printing interruption position corresponding to printing of the print data of the first user interrupted by a print process of the second user, and the restarting unit restarts the printing of the print data of the first user from the printing interruption position.

8. A control method of an image processing apparatus capable of communicating with a print managing server that manages print data in association with user identification information, the control method comprising steps of:
    storing user identification information of a first user in a memory in response to receiving the user identification information of the first user;
    sending a print instruction including the user identification information of the first user stored in the memory to the print managing server;
    receiving print data of the first user managed in association with the user identification information of the first user included in the sent print instruction;
    printing the received print data of the first user;
    receiving user identification information of a second user while printing of the print data of the first user is being performed;
    performing a permission/inhibition discrimination to discriminate whether or not interruption printing of print data of the second user managed in association with the user identification information of the second user can be performed;
    determining whether or not the permission/inhibition discrimination is to be enabled;
    performing the interruption printing of the print data of the second user when it is determined that the permission/inhibition discrimination is to be enabled and if is discriminated that the interruption printing of the print data of the second user can be performed; and
    restarting the interrupted printing of the print data of the first user after the interruption printing of the print data of the second user is finished,
    wherein, when it is determined that the permission/inhibition discrimination is not to be enabled and if the print data of the first user is undergoing printing, the interruption printing of the print data of the second user is performed in response to a re-reception of the user identification information of the first user regardless of a discrimination result of the permission/inhibition discrimination.

9. The control method according to claim 8, wherein, when it is discriminated in the permission/inhibition discrimination that the print data of the first user is not undergoing printing, a print instruction including the user identification information of the second user is sent to the print managing server and the print data of the second user managed in association with the user identification information of the second user included in the sent print instruction is received, and
    wherein the printing step includes printing the received print data of the second user.

10. The control method according to claim 8, further comprising a step of determining, when it is discriminated in the permission/inhibition discrimination that the interruption printing of the print data of the second user cannot be performed, that performing the interruption printing of the print data of the second user is possible by receiving an approval instruction of the first user.

11. The control method according to claim 8, wherein it is discriminated in the permission/inhibition discrimination whether or not the interruption printing of the print data of the second user managed in association with the user identification information of the second user can be performed based on print authority information, interruption permission/inhibition information, information on a number of interruption-permitted jobs, and information on a number of interruption-permitted persons.

12. The control method according to claim 8, wherein the step of performing the interruption printing of the print data of the second user includes:
    obtaining a list of print data of the second user managed in association with the user identification information of the second user, and
    receiving a print instruction for desired print data among the obtained list of print data of the second user.

13. The control method according to claim 12, wherein the print instruction for the desired print data is received in response to the user identification information of the second user being received.

14. The control method according to claim 8, further comprising a step of storing, in the memory, a printing interruption position of the print data of the first user interrupted by a print process of the second user, wherein the printing of the print data of the first user is restarted from the printing interruption position.

15. A non-transitory computer-readable recording medium storing a program that when executed causes a computer to perform a control method of an image processing apparatus capable of communicating with a print managing server that manages print data in association with user identification information, the control method comprising steps of:
- storing user identification information of a first user in a memory in response to receiving the user identification information of the first user;
- sending a print instruction including the user identification information of the first user stored in the memory to the print managing server;
- receiving print data of the first user managed in association with the user identification information of the first user included in the sent print instruction;
- printing the received print data of the first user;
- receiving user identification information of a second user while printing of the print data of the first user is being performed;
- performing a permission/inhibition discrimination to discriminate whether or not interruption printing of print data of the second user managed in association with the user identification information of the second user can be performed;
- determining whether or not the permission/inhibition discrimination is to be enabled;
- performing the interruption printing of the print data of the second user when it is determined that the permission/inhibition discrimination is to be enabled and if is discriminated that the interruption printing of the print data of the second user can be performed; and
- restarting the interrupted printing of the print data of the first user after the interruption printing of the print data of the second user is finished,
wherein, when it is determined that the permission/inhibition discrimination is not to be enabled and if the print data of the first user is undergoing printing, the interruption printing of the print data of the second user is performed in response to a re-reception of the user identification information of the first user regardless of a discrimination result of the permission/inhibition discrimination.

16. The non-transitory computer-readable recording medium according to claim 15,
wherein, when it is discriminated in the permission/inhibition discrimination that the print data of the first user is not undergoing printing, a print instruction including the user identification information of the second user is sent to the print managing server and the print data of the second user managed in association with the user identification information of the second user included in the sent print instruction is received, and
wherein the printing step includes printing the received print data of the second user.

17. The non-transitory computer-readable recording medium according to claim 15, wherein the control method further comprises a step of determining, when it is discriminated in the permission/inhibition discrimination that the interruption printing of the print data of the second user cannot be performed, that performing the interruption printing of the print data of the second user is possible by receiving an approval instruction of the first user.

18. The non-transitory computer-readable recording medium according to claim 15, wherein it is discriminated in the permission/inhibition discrimination whether or not the interruption printing of the print data of the second user managed in association with the user identification information of the second user can be performed based on print authority information, interruption permission/inhibition information, information on a number of interruption-permitted jobs, and information on a number of interruption-permitted persons.

19. The non-transitory computer-readable recording medium according to claim 15, wherein the step of performing the interruption printing of the print data of the second user includes:
- obtaining a list of print data of the second user managed in association with the user identification information of the second user, and receiving a print instruction for desired print data among the obtained list of print data of the second user.

20. The non-transitory computer-readable recording medium according to claim 19, wherein the print instruction for the desired print data is received in response to the user identification information of the second user being received.

21. The non-transitory computer-readable recording medium according to claim 15, wherein the control method further comprises a step of storing, in the memory, a printing interruption position of the print data of the first user interrupted by a print process of the second user, wherein the printing of the print data of the first user is restarted from the printing interruption position.

* * * * *